United States Patent
Tyree et al.

(10) Patent No.: US 7,764,222 B2
(45) Date of Patent: *Jul. 27, 2010

(54) ADAPTIVE PULSE DETECTION FOR ALL-DIGITAL LINE-OF-SIGHT (LOS) PROCESSOR

(75) Inventors: Anthony K. Tyree, Tucson, AZ (US); Michael C. Snyder, Tucson, AZ (US); Donald R. Houser, Tucson, AZ (US); William J. Schmitt, Tucson, AZ (US); Robert J. Schaller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/212,976

(22) Filed: Sep. 18, 2008

(65) Prior Publication Data

US 2010/0067587 A1    Mar. 18, 2010

(51) Int. Cl.
*G01S 13/00*    (2006.01)

(52) U.S. Cl. .............................. 342/89; 342/93; 342/91
(58) Field of Classification Search ................... 342/93
See application file for complete search history.

(56) References Cited

U.S. PATENT DOCUMENTS

| 6,075,812 | A | * | 6/2000 | Cafarella et al. | ............ 375/141 |
| 6,320,541 | B1 | | 11/2001 | Pozgay et al. | |
| 2007/0132634 | A1 | | 6/2007 | Wakeman | |

* cited by examiner

*Primary Examiner*—Thomas H Tarcza
*Assistant Examiner*—Timothy A Brainard
(74) *Attorney, Agent, or Firm*—Eric A. Gifford

(57) ABSTRACT

An all-digital line-of-sight (LOS) process architecture addresses the size, weight, power and performance constraints of a receiver for use in semi-active or active pulsed electromagnetic (EM) targeting systems. The all-digital architecture provides a platform for enhanced techniques for sensitive pulse detection over a wide field-of-view, adaptive pulse detection, LOS processing and counter measures.

19 Claims, 18 Drawing Sheets

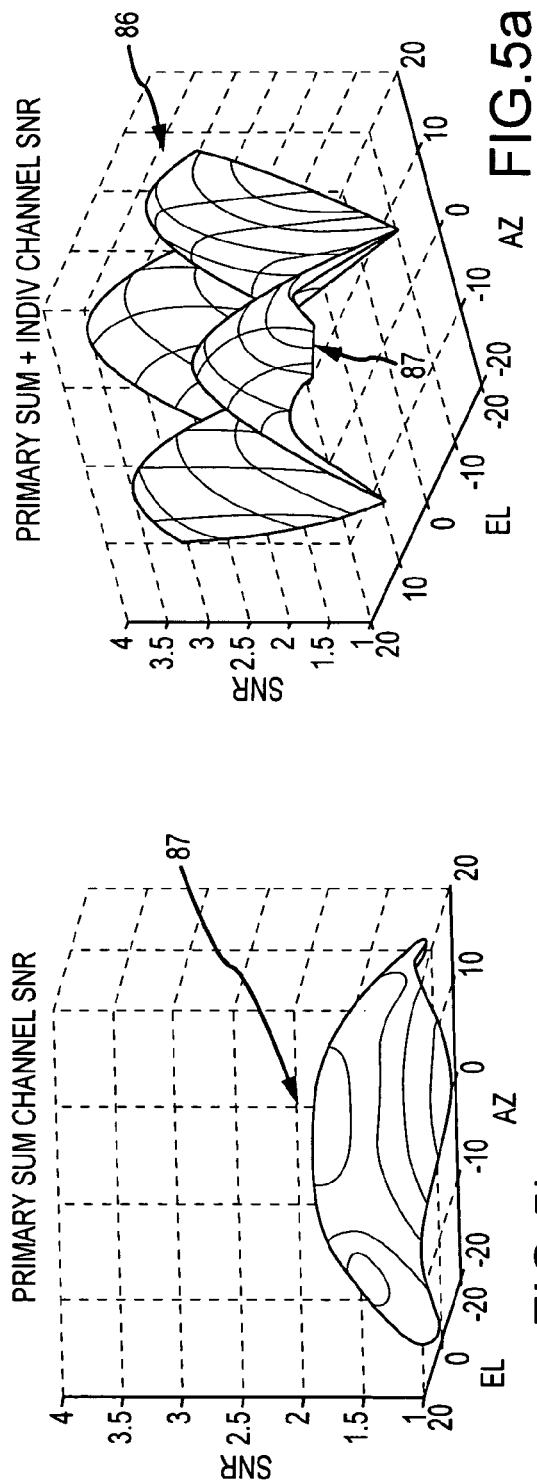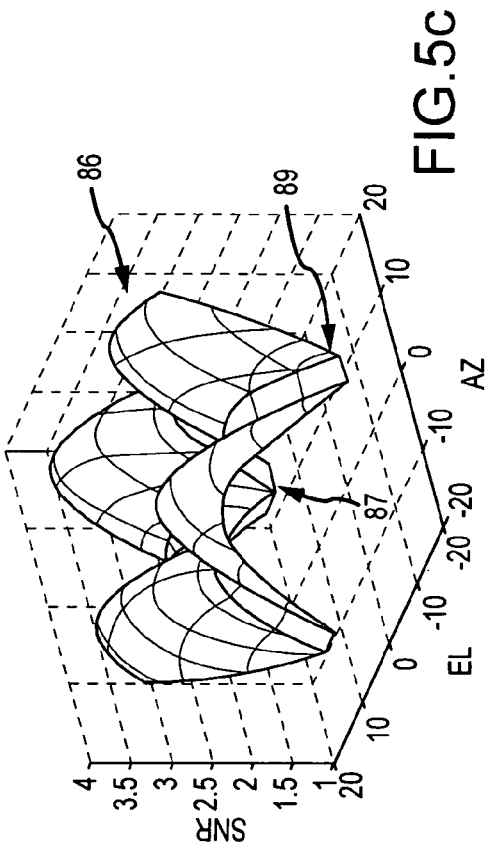
FIG.5a — PRIMARY SUM + INDIV CHANNEL SNR
FIG.5b — PRIMARY SUM CHANNEL SNR
FIG.5c — PRIMARY SUM + SECONDARY SUM + INDIV CHANNEL SNR

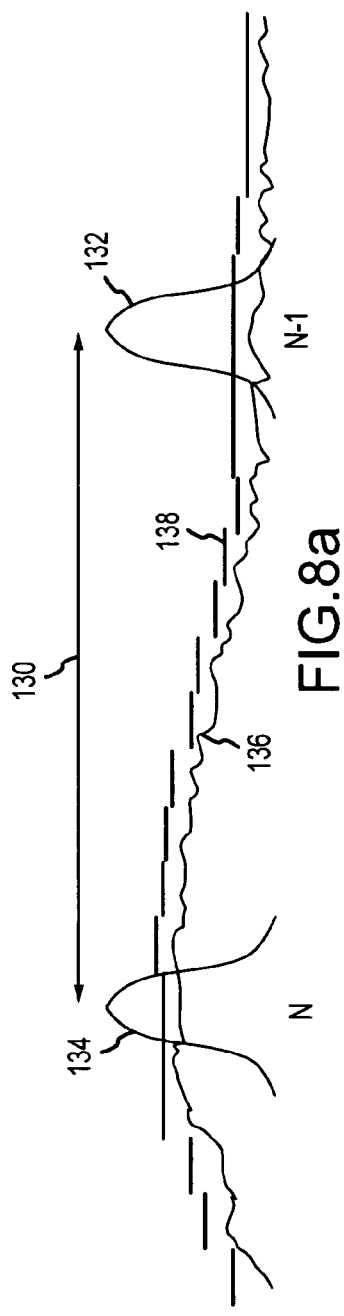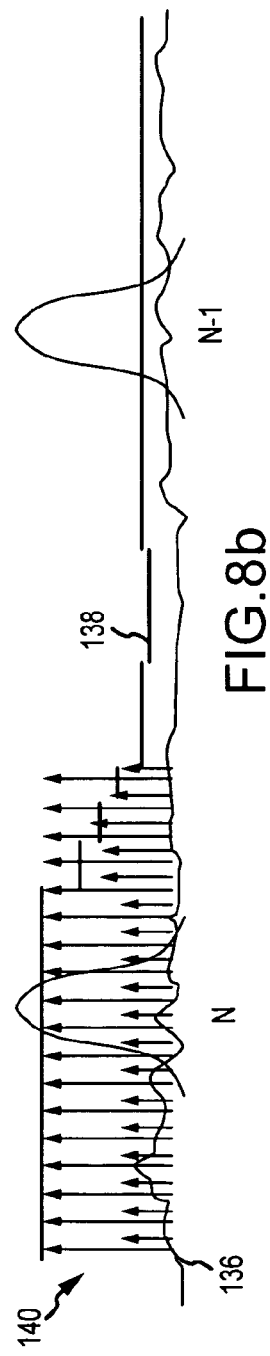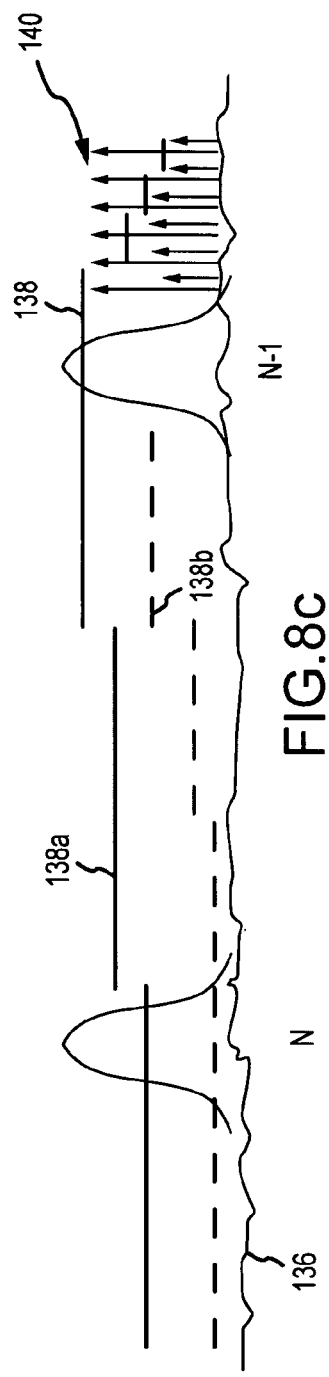

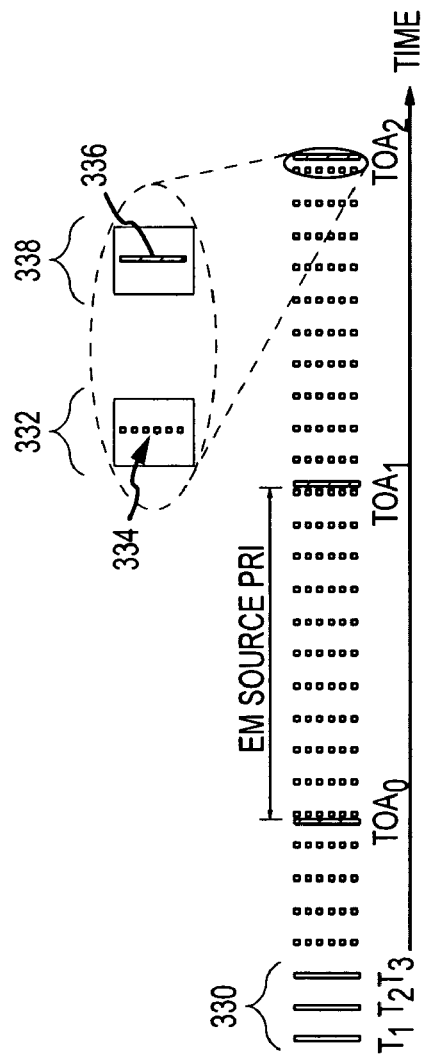
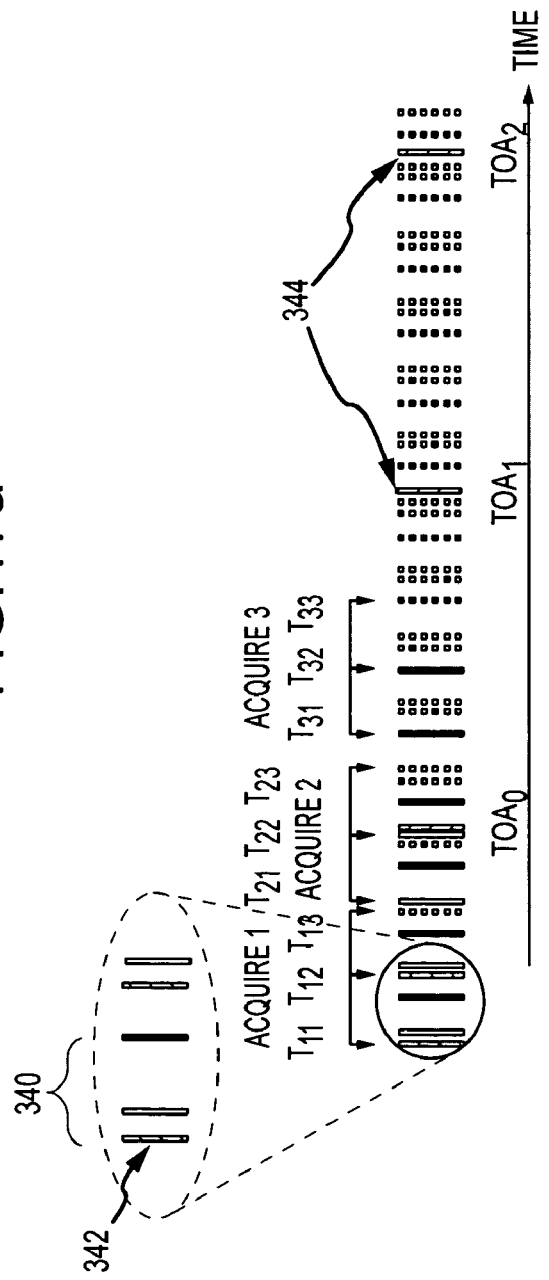
FIG. 17a
FIG. 17b

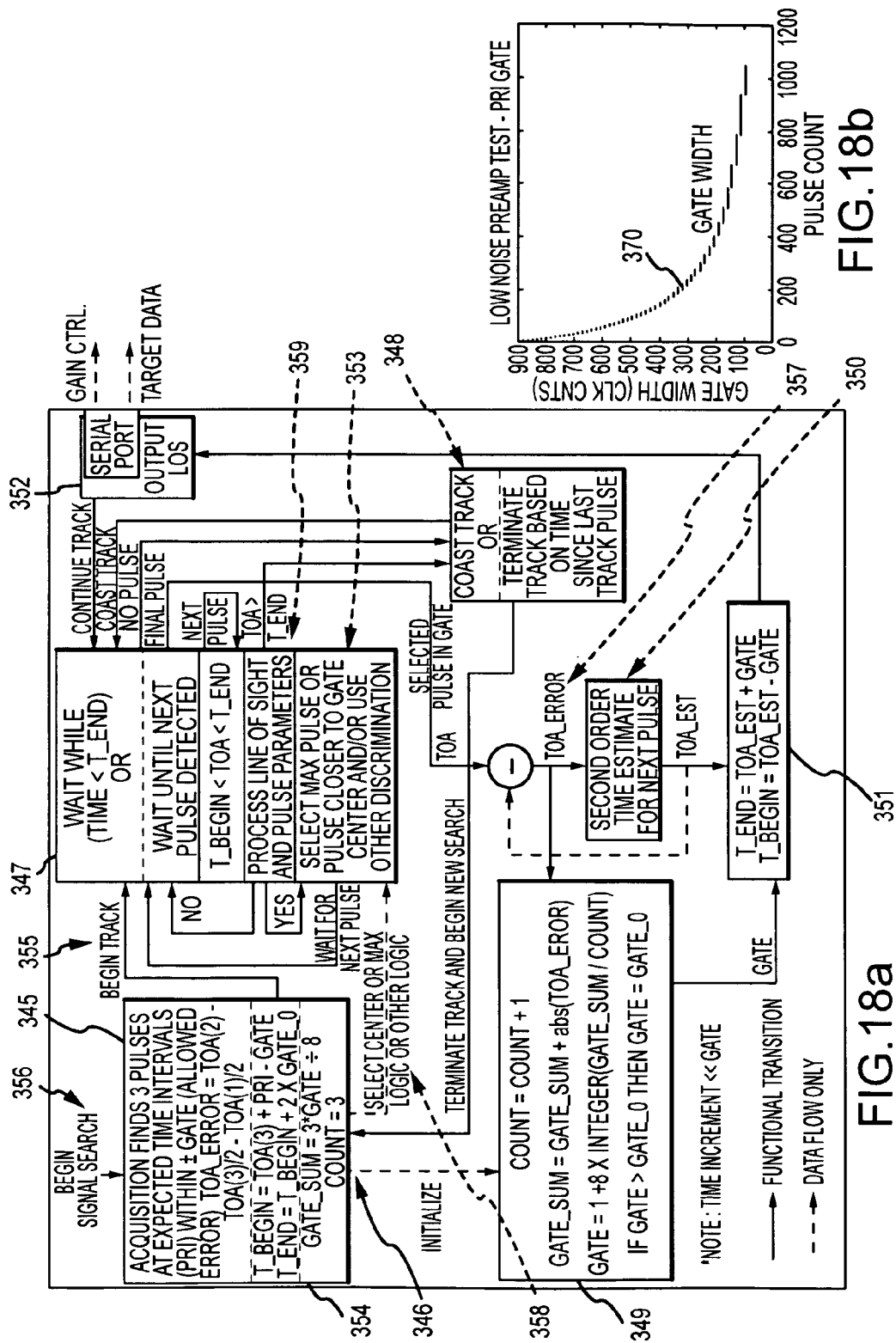

ADAPTIVE PULSE DETECTION FOR ALL-DIGITAL LINE-OF-SIGHT (LOS) PROCESSOR

BACKGROUND OF THE INVENTION

1. Field of the Invention

This invention relates to a line-of-sight (LOS) processor architecture for a receiver for use in semi-active or active pulsed electromagnetic (EM) targeting systems, and more particularly to an all-digital architecture that addresses the size, weight and power constraints of typical applications and provides a platform for enhanced techniques for sensitive pulse detection over a wide field-of-view, adaptive pulse detection, LOS processing and counter measures.

2. Description of the Related Art

Certain aircraft, missiles and smart projectiles include a receiver that allows the platform to receive and process EM pulses, typically in the near IR, transmitted by a known source and returned off of a target. The receiver may be fixed to look along the line-of-sight (LOS) of the platform or gimbaled to look along a receiver LOS relative to the platform LOS. If the source is remotely located the system is referred to as 'semi-active' whereas if the source is co-located on the platform with the receiver the system is referred to as 'active'. The receiver may perform many different functions including acquisition and tracking, identification, active countermeasures and aimpoint selection. A core capability required to support each of these functions is to reliably and accurately detect the presence of EM pulses returned from a real target from amidst natural clutter and active jamming and to measure the line-of-sight (LOS) from the platform to the target. Errors in detection or LOS processing can cause mission failure.

As shown in FIG. 1, a typical receiver 10 includes a quad detector 12 that detects incident radiation (e.g. transmitted pulses reflected off a target, pulses transmitted to actively jam the receiver and background noise) and generates analog signals 14, a bank of pre-amps 15 that amplify the analog signals 14 and a LOS processor 16 that detects "pulses", calculates a LOS to a target and performs additional processing to generate a target report 18 that is passed on to a command and guidance processor 20 to guide the platform to the target.

LOS processor 16 is based on a mixed analog/digital architecture and functionality. The processor can be roughly divided into three functional areas: pulse detection 22, LOS calculation 24 and DSP post-processing on the pulses and LOS 26. Pulse detection 22 is a standard analog operation in which an analog sum channel is thresholded to satisfy a Constant False Alarm Rate (CFAR) criteria evaluated over a fixed period (typically multiple EM pulse repetition intervals for the known source) to identify candidate pulses. Parameters such as rise/fall times and pulse width are extracted from each candidate pulse and evaluated to independently determine whether the candidate pulse is a real target pulse. Upon validation of a target pulse, a sample and hold circuit samples the analog signals once near the peak and analog circuits combine the peak values to provide the LOS calculations 24. Ideally, the analog signals are sampled at the peak but there is some degree of alignment error between peak detection and the delayed analog signals. The DSP post-processing 26 performs time-correlation on the validated pulses to determine if they occur at the expected repetition rate of the transmitted EM pulses and to determine if the LOS calculations are acquiring and tracking a target.

SUMMARY OF THE INVENTION

The present invention provides an all-digital LOS processor architecture with improved pulse detection and LOS calculation performance at reduced size, weight and power that provides a platform for enhanced techniques for sensitive pulse detection over a wide field-of-view, adaptive pulse detection, LOS processing and counter measures.

In a first embodiment, the all-digital LOS processor includes a plurality of A/D converters for converting analog signals from a multi-channel detector into a plurality of digital signals on respective individual channels. A digital summer sums all the digital signals to produce a digital signal on a primary sum channel. The architecture is expand able to sum different subsets of less than all the individual digital signals to produce digital signals on respective secondary sum channels. The secondary sum channels fill the gap between the field of view (FOV) of the individual channels and the primary sum channel.

Depending on system performance and processor cost considerations, pulse detection can be performed on all of these channels or different subsets of the channels as long as detection is performed on multiple channels of which at least one channel is a sum channel. In an optimal performance configuration, digital pulse detectors compare sample amplitudes on the individual and the primary and secondary sum channels to respective detection thresholds to detect pulses with sensitivity over a wide FOV. In another configuration, pulse detection is performed on the primary and secondary sum channels and not the individual channels. In yet another configuration, pulse detection is performed on only the individual and secondary channels. In even yet another configuration, pulse detection is performed on only the secondary channels.

The detection process is preferably configurable to allow any digital channel to be activated or deactivated interactively based on an a priori LOS estimate of the target or on a LOS estimate with time and the observed (measured) EM signal parameters. Down selection to the subset of channel(s) expected to have the highest SNR can reduce susceptibility to false alarms and jammers. Typically the individual channels will be deactivated from detection upon establishment of signal track and only the primary sum channel will remain active for detection. Alternately, the sensor on the platform may be steered so that an individual channel or a secondary sum channel, which exhibit higher peak SNR than the primary sum channel albeit for a narrower FOV, is pointed at the estimated position of the target. If an individual channel is deactivated from pulse detection, the channel is still sampled and stored for LOS processing.

Upon detection of a pulse by any one of the active detectors, a memory controller stores a plurality of samples for each individual channel in a memory. An embedded processor processes the samples for the individual channels to calculate a LOS to a target. Pulse detection is improved by detecting pulses on all of the channels or subsets of channels, not just a primary sum channel. The LOS calculation is improved by processing the amplitudes of multiple samples for each individual channel to better estimate a peak value. Except for the A/D converters, the rest of the digital processing may be integrated in a single processor. This all-digital architecture provides the platform on which additional digital signal processing can be implemented to further improve pulse detection and LOS calculations and to implement effective countermeasures.

Detection performance may be enhanced by matched filtering the digital signals. The filters are 'matched' to the approximately known characteristics of the EM pulses. These filters may adapt as the processor tracks a target to further boost performance.

Detection performance and processor throughput may be further enhanced by performing a time-correlation of the detected pulses to the expected repetition rate/time-interval of the EM pulses prior to applying the pulse discrimination logic to each detected pulse. This removes a large number of spurious pulses prior to the more computationally intensive pulse discrimination. This also allows for individual pulse parameters, joint pulse parameters and time-correlation errors to be combined into a more complete association error for acceptance or rejection of multiple pulses as a pulse train. The processor suitably identifies the strongest SNR channel (individual or sum) for each detected pulse and then uses that channel's pulse for both time-correlation and pulse discrimination. The strongest channel is used to determine the curve fitting parameters to estimate the peak from the stored amplitude samples with the parameters being applied to the other individual channels.

In a second embodiment, the all-digital LOS processor includes a plurality of A/D converters for converting analog signals from a multi-channel detector into a plurality of digital signals on respective individual channels. One or more digital summers sum all and/or subsets of the digital signals to produce digital signals on a primary sum channel and secondary sum channels, respectively. At least one digital pulse detector on a sum channel, and preferably all channels, compares sample amplitudes of the digital signals to a detection threshold to detect pulses including "pulses" samples with amplitudes above the threshold and "noise" samples with amplitudes at or below the threshold. Upon detection of a pulse, a memory controller stores a plurality of samples for each individual channel in a memory. An embedded processor processes the samples for the individual channels to calculate a LOS to a target. At least one threshold processor on the sum channel, preferably all channels, processes the noise samples to estimate noise and update the detection threshold as a function of the noise. The processor performs the calculation and updates the detection threshold multiple times in the known period between EM pulses. The detection threshold is suitably updated as a function of both the noise and a CFAR factor. The CFAR factor may be evaluated on a fixed period as is convention. To improve responsiveness, the CFAR factor is preferably increased as soon as a max rate is exceeded within the fixed period and the period and count reset. The CFAR factor may be established jointly for all channels or independently for each channel allowing another technique for desensitizing the detection on individual channels as opposed to turning a channel off. The combination of the modified CFAR factor and the noise statistics makes the individual and sum channel detection thresholds more responsive to actual real-time conditions on each channel, thus improving the detection of real EM pulses and suppressing the detection of noise or jamming pulses. Except for the A/D converters, the rest of the digital processing may be integrated in a single processor.

In a third embodiment, the all-digital LOS processor includes a plurality of A/D converters for converting analog signals from a multi-channel detector into a plurality of digital signals on respective individual channels. One or more digital summers sum all and/or subsets of the digital signals to produce digital signals on a primary sum channel and secondary sum channels, respectively. At least one digital pulse detector on a sum channel, and preferably all channels, compares sample amplitudes to a detection threshold to detect pulses including pulse samples with amplitudes above the threshold and leading and lagging samples with amplitudes below the threshold. Upon detection of a pulse, a memory controller stores a plurality of samples for each individual channel in a memory. A processor determines a strongest SNR channel from the individual and sum channels, estimates a pulse width for the strongest channel, selects the time samples to be processed and determines the logic and scale factor to fit a curve to the selected time samples for all channels based on the pulse width estimate. The processor applies the logic and scale factor to the selected time samples in each individual channel to estimate a peak amplitude and then calculates a LOS to the target from the estimated peak amplitudes. If a channel is dropped or saturates, the processor can adjust the estimation and LOS calculations accordingly. Although typically not stored in memory, the samples for the sum channel(s) can be recreated from the individual channel if a sum channel is the only or strongest channel for a given pulse. Except for the A/D converters, the rest of the digital processing may be integrated in a single processor.

Pulse width is preferably computed as a function of the amplitudes of the plurality of stored pulse and leading/lagging samples for the strongest SNR channel. Conventional pulse width estimates, for pulse discrimination not LOS calculation, typically count the number of detected samples and multiple by the sampling period. This approach does not provide a sufficiently accurate or stable estimate of the pulse width. To determine pulse width, we identify all samples that lie above a threshold measured down from the maximum amplitude sample (e.g. 6 dB down from the max) and at least one sample on either side that lies below the threshold. The pulse width is measured as the power in these samples divided by the peak energy.

The curve fit may be a conventional linear curve fit to an $N^{th}$ order polynomial or an alternate linearization of a curve fit algorithm. For the same number of calculations, the latter approach provides a more accurate estimate of the peak. Essentially, the latter approach looks at the two samples with the largest amplitudes in each channel for a given pulse. If one amplitude is considerably greater than the other, the larger amplitude is probably very close to the peak amplitude of the underlying analog signal. In this case, either the larger amplitude is accepted as the estimate of the peak or increased by a small scale factor. If the two amplitudes are close, the peak amplitude of the underlying analog signal lies approximately at a mid-point in time between the two samples. In this case, the larger amplitude is adjusted by a larger scale factor. The strongest SNR channel is used to select the two time samples that will be used for all channels, to determine a scale factor that is used for all channels and to control whether an averaging logic is applied to a given pulse or the above curve fit logic is applied.

In a fourth embodiment, the all-digital LOS processor includes a plurality of A/D converters for converting analog signals from a multi-channel detector into a plurality of digital signals on respective individual channels. One or more digital summers sum all and/or subsets of the digital signals to produce digital signals on a primary sum channel and secondary sum channels, respectively. At least one digital pulse detector on a sum channel, and preferably all channels, compares sample amplitudes to a detection threshold to detect pulses. Upon detection of a pulse, a memory controller stores a plurality of samples for each individual channel in a memory. A filter removes pulses that occur at frequencies greater than an octave above a known repetition rate of the EM pulses. A processor processes the samples for the individual channels to calculate a LOS to a target. The removed pulses are typically "jammer" pulses transmitted to prevent the LOS processor from acquiring and tracking the target. The primary goal of the jammer pulses is to overwhelm the processor and memory, not to obfuscate the real EM pulses. Therefore it is useful to aggressively identify and remove jammer pulses as soon as possible to remove them from memory and to avoid applying the pulse discrimination logic to such pulses. A notch filter can be configured to remove either single-frequency or pseudo-random jammer pulses that lie more than an octave above the repetition rate of the EM pulses. In some instances, jammer pulses that occur at approximately the same time as an EM pulse cannot be removed by the notch filter and appear in the time-correlation track gate with the EM pulse. The processor suitably selects the pulse that lies closest to the middle of the track gate, the pulse that occurs either before or after any other pulses within the track gate or the pulse with the largest amplitude. Once the target is acquired, the track gate is narrowed, which helps to eliminate jammer pulses not removed by the notch filter.

The notch filter is particularly effective when used as a front-end process for adaptive thresholding based on both the CFAR and channel noise. If the notch filter effectively removes jammer pulses, the threshold processor will optimize the threshold to detect EM pulses to acquire and track the target. If the notch filter cannot remove jammer pulses, the threshold process will react very quickly (e.g. much less than one repetition pulse interval of the EM pulses), treating the jammer pulses as noise or false-alarms, to raise the threshold to prevent further detection of jammer pulses.

In a fifth embodiment, the all-digital LOS processor incorporates the all-digital architecture to detect pulses on all of the channels including the individual and primary and any secondary channels, allowing for selective activation and deactivation of any of the channels, and save multiple samples for each detected pulse, the notch filter to remove jammer pulses, adaptive thresholding based on both channel noise and CFAR to better discriminate pulses and enhanced LOS processing on the multiple samples to better estimate the peak amplitudes. The notch filtering, time-correlation, pulse discrimination logic and LOS processing to determine a curve fit are all preferably performed on the 'strongest' channel for each detected pulse.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a, 5b and 5c, are SNR plots for the primary sum channel, four individual channels and a composite of the individual, primary and four secondary channels for a quad-detector, respectively;

FIGS. 8a through 8c are diagrams illustrating adaptive thresholding for pulse detections as a function of real-time noise statistics and CFAR as pulses are detected;

FIGS. 17a and 17b are diagrams illustrating the high pulse repetition frequency (HPRF) notch filter for eliminating jamming pulses for single-frequency and pseudo random jamming sequences, respectively; and FIGS. 18a and 18b are a more detailed flow diagram of the logic sequence and a plot of gate width as the processor tracks.

DETAILED DESCRIPTION OF THE INVENTION

The present invention describes an all-digital architecture for a line-of-sight (LOS) processor on a receiver for use in semi-active or active pulsed electromagnetic (EM) targeting systems. The all-digital architecture addresses the size, weight, power and performance constraints of typical applications and provides enhanced techniques for adaptive detection, LOS processing and counter measures. The receiver is mounted on a platform such as a missile, smart, projectile or bomb to receive EM pulses from a known source on the same or different platform reflected off a target. The receiver may be fixed to look along the line-of-sight (LOS) of the platform or gimbaled to look along a receiver LOS relative to the platform LOS. The EM pulses can be electro-optic EO (SWIR, NIR, MWIR, LWIR), RF (radio frequency) or MMW (millimeter wave). The approximate pulse shape (e.g. width) and repetition rate (pulse interval) is known to the receiver.

All-Digital LOS Processor Architecture

Figure 1:
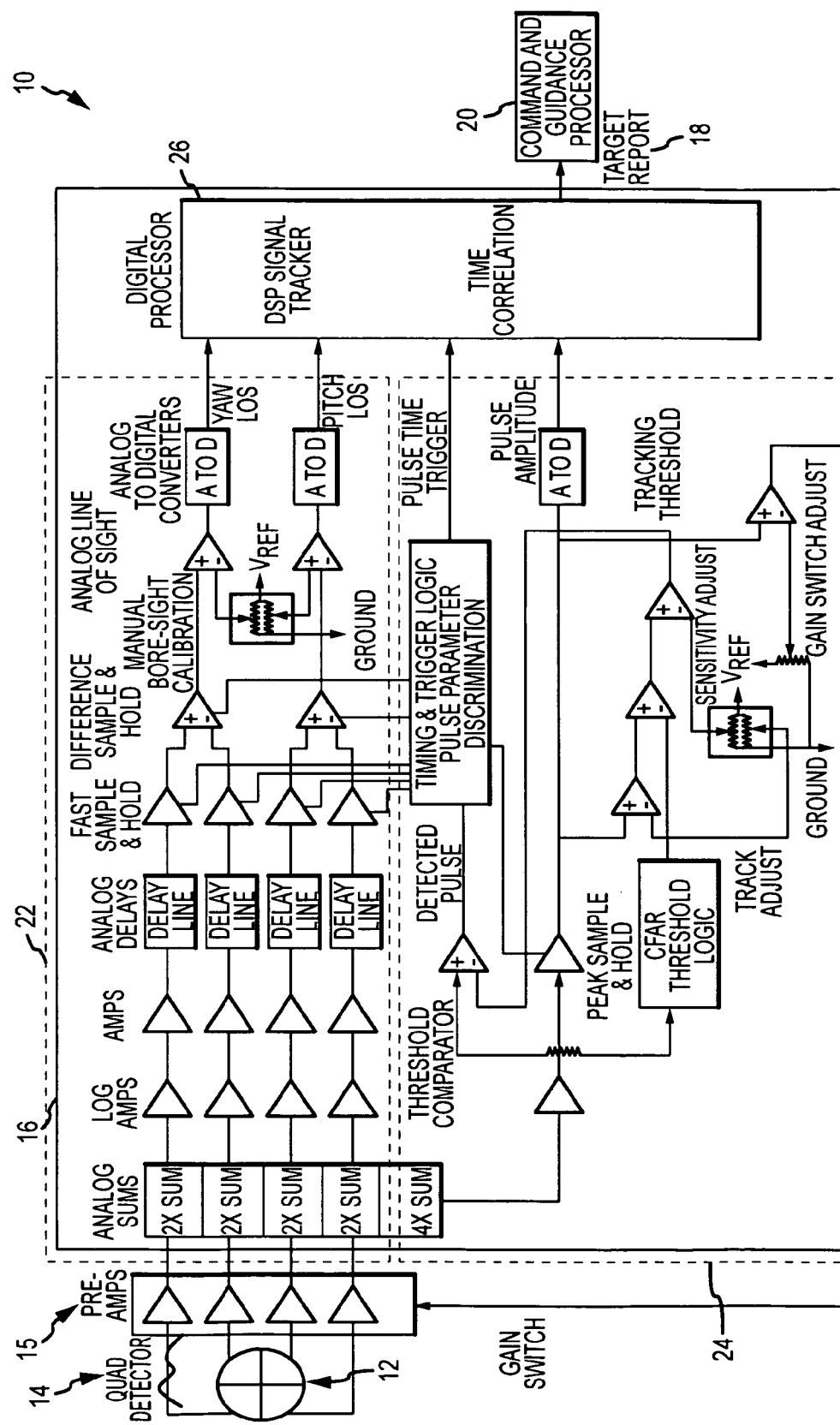
FIG. 1, as described above, is a block diagram of an analog semi-active laser (SAL) LOS processor.
Figure 2:
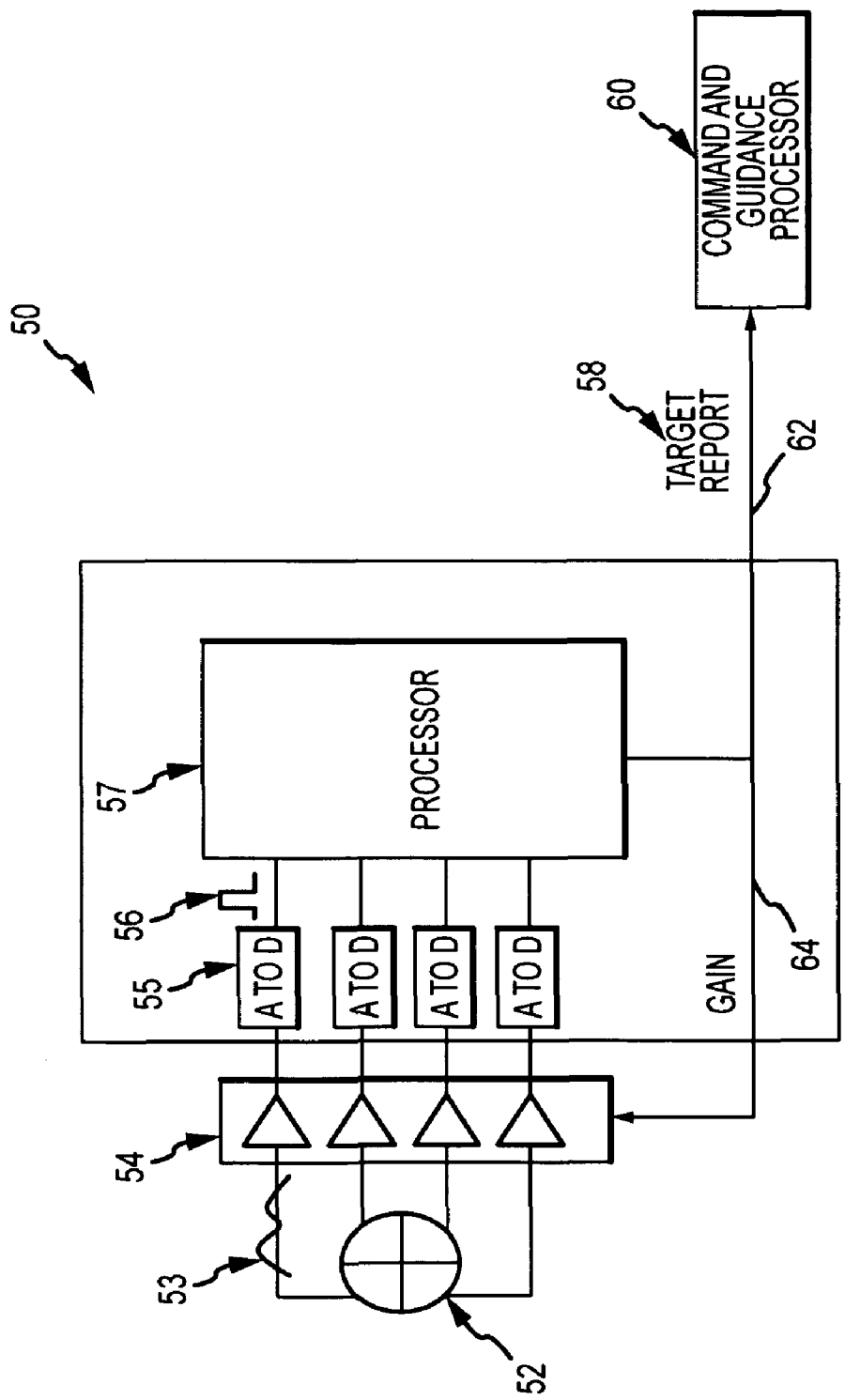
FIG. 2 is a diagram of an all-digital LOS processor in accordance with the present invention.

As shown in FIG. 2, a receiver 50 includes a quad detector 52 that detects incident radiation (e.g. transmitted pulses reflected off a target, pulses transmitted to actively jam the receiver and background noise) and generates analog signals 53, a bank of pre-amps 54 that amplify the analog signals 53 and A/D converters 55 that convert analog signals 53 to digital signals 56 on individual channels A, B, C and D. The digital signals comprise a sequence of samples each having a sample or time index and an amplitude. The samples may be referred to in context as "samples", "time samples" or "amplitude samples" depending on whether the relevant property is the time-index or the amplitude. A digital LOS processor 57 detects "pulses", calculates a LOS to a target and performs additional processing to generate a target report 58 that is passed on to a command and guidance processor 60 via digital bus 62 to guide the platform to the target. The processor provides a gain that is passed back to the pre-amps via digital bus 64. This figure illustrates that all of the pulse detection and LOS processes, except for the front-end A/D conversion, is digital and may be implemented in a single processor 57 that includes memory. Receiver 50 is typically mounted on a platform such as a missile, bomb or smart projectile that is guided to a target. The various digital functions may be separated into different processors. The all-digital architecture is smaller, lighter weight and uses less power than the standard LOS processor. The all-digital architecture provides a platform for implementing digital processing techniques to enhance the performance of the key pulse detection and LOS calculation and to provide additional functionality.

Figure 3:
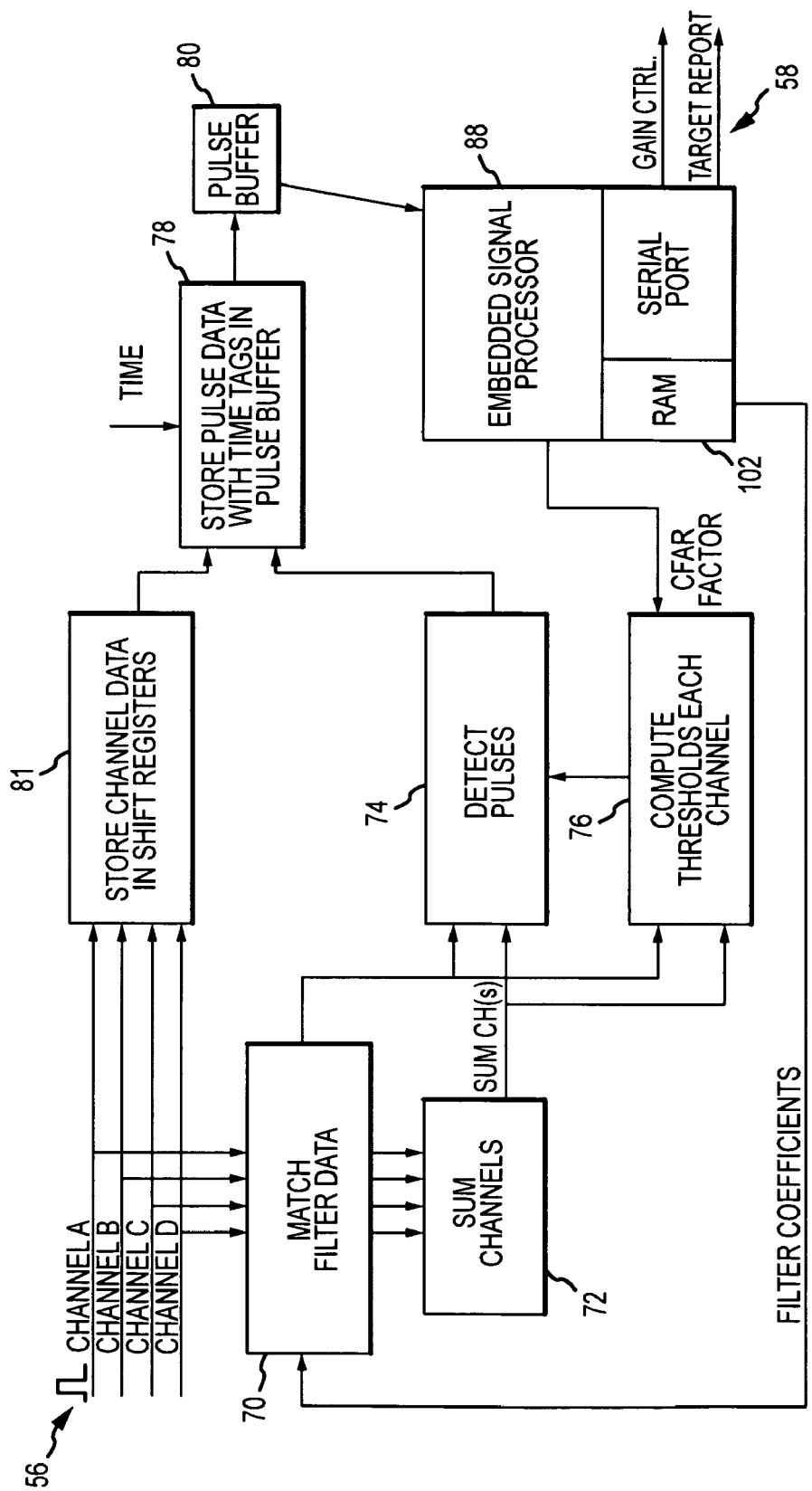
FIG. 3 is a functional block diagram of the all-digital LOS processor.
Figure 4:
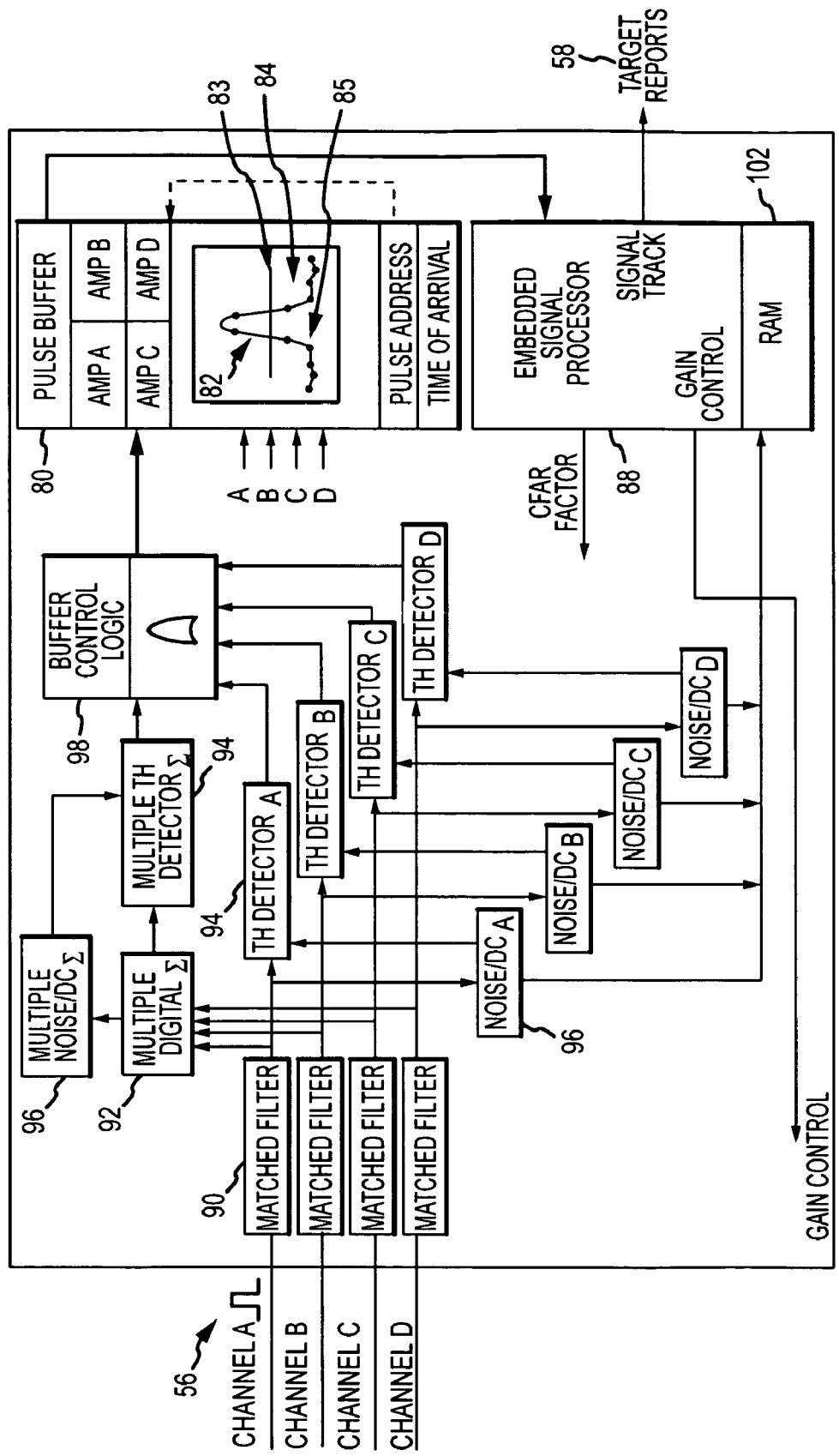
FIG. 4 is a block diagram illustrating the four channels of the LOS processor for a quad-detector.

Different functional and architectural features of the all-digital LOS processor 57 are illustrated in FIGS. 3 and 4. The digital signals 56 on individual digital channels A, B, C and D are optionally match filtered 70 (matched filter 90) to improve the signal-to-noise ratio (SNR) of each channel (described in more detail in FIG. 6). The approximate shape (e.g. width) of the transmitted pulses is known. Typically, the receiver will be provided with the pulse specification for the class of transmitter. As the target is acquired and tracked, the actual pulse width can be estimated and used to update the filter coefficients to further improve the matched filter. Matched filtering is optional and the filtered data is preferably only used for the initial detection or pulse capture. The raw digital data (samples with a time index and amplitude value) is stored and used for processing.

The filtered digital channels are digitally summed 72 (digital summer 92) to form a one or more sum channels. All the digital signals may be summed to produce a "primary" sum channel. In addition to or instead of the primary sum channel, different subsets of less than all the individual digital signals may be summed to produce different digital signals on respective secondary sum channels. For example, in a quad-detector the four different pair combinations (A+B, B+C, C+D, D+A) of channels A, B, C and D produce four different secondary sum channels. The primary and secondary sum channels fill the gaps between the field of view (FOV) of the individual channels. The sums progress from individual channels (no sum) with the smallest FOV coverage per channel but maximum SNR, to secondary sum channels to increase the FOV coverage per channel but with lower SNR to the primary sum channel that covers all of the FOV but has the lowest SNR. The individual channels form lobes in angle coordinates that have a high SNR at the center of a lobe but lower SNR as the target gets away from the center. The secondary sum channels fill in the SNR nulls along the AZ and EL axis and the primary sum channel fills in the null at boresight (AZ=0, EL=0).

Depending on system performance and processor cost considerations, pulse detection can be performed on all of these channels or different subsets of the channels. In an optimal performance configuration, digital detectors compare sample amplitudes on the individual and the primary and secondary sum channels to respective detection thresholds to detect pulses. In another configuration, pulse detection is performed on the primary and secondary sum channels and not the individual channels. In yet another configuration, pulse detection is performed on only the individual and secondary channels. In even yet another configuration, pulse detection is performed on only the secondary channels. Note, if the processor is configured in such a manner that the primary sum channel or secondary sum channels are not used to detect pulses than the digital summer(s) that create these sum channels are not needed.

For the primary sum channel, a signal level that would produce a SNR equal to 1.0 at the Field Of View edge and a SNR of 2.0 at the center of the FOV is shown in the table for the same signal strength and individual channel noise.

|  | FOV Edge | FOV Center | Highest SNR |
|---|---|---|---|
| a) Primary | 1 | 2.0 | 2.0 |
| b) Individual | 1.5 | 1.4 | 4.0 |
| c) Primary + indiv | 1.5 | 2.0 | 4.0 |
| d) Secondary | 1.8 | 1.7 | 2.8 |
| e) Primary + Secondary | 1.8 | 2.0 | 2.8 |
| f) Secondary + indiv | 1.8 | 1.7 | 4.0 |
| g) Primary + Secondary + indiv | 1.8 | 2.0 | 4.0 |

Each of the individual filtered channels and the sum channel(s) are independently processed to detect pulses 74 (threshold pulse detector 94). Pulses are detected by comparing the sample amplitudes to a threshold; samples having amplitudes that exceed the threshold indicate a possible pulse and are labeled "pulse" samples while samples having amplitudes at or below the threshold are labeled "noise" samples. The few noise samples in front of a pulse are called "leading" samples while the few noise samples trailing the pulse are called "lagging" samples. The leading and lagging samples may or may not include pulse energy depending on the pulse width and threshold. As will be described in more detail with reference to FIGS. 8-10, the threshold for each individual channel and the sum channel(s) are preferably computed 76 as a function of both a CFAR factor and the channel noise and DC (mean value) (noise/DC processor 96) derived from the noise samples. The CFAR factor and command may be computed for all channels together or for each channel individually.

Upon detection of a pulse by any of the channels, multiple samples of the raw digital data with time tags are stored 78 (buffer control logic 98) in a pulse buffer 80 for each of the individual channels. The raw digital data is delayed in shift registers 81 so that it is time-aligned to the pulse detection. For each pulse, "pulse" samples 82 above a threshold 83 and "leading" samples 84 and "lagging" samples 85 below the threshold are stored. Each sample is tagged with a time of arrival. For each detected pulse, one of the sum or individual channels is designated as the 'strongest' channel based on SNR. The digital data for the sum channel(s) are not typically stored in the pulse buffer. This data can be recreated from the individual channels if needed. The sum channel data may be needed if a sum channel is the strongest channel in order to perform time-correlation and pulse discrimination and to determine the curve fit for peak estimation.

The strongest channel is the channel with the highest SNR, also the channel that typically detects a pulse first. As shown in FIGS. 5a-5c, the SNR 86 of each individual channel, the SNR 87 of the primary sum channel and the SNR 89 of the secondary sum channels are strongest in different regions (e.g. FOVs) of the quad-detector. Depending on the current LOS to the target, the returned EM pulses will be detected more strongly in one region. A simple and effective way to assign the strongest SNR channel is to select the channel with the maximum sample amplitude for a given pulse or assign the sum channel when the difference between the maximum channel amplitude and the minimum channel amplitude is below a threshold (all channel amplitudes are nearly equal). Once the receiver locks-on to and tracks the target, the receiver platform should point at the target and the sum channel would be expected to be the strongest channel. Therefore, the performance of pulse detection on all channels and the selection of a strongest channel are most important for initial acquisition and reacquisition should the receiver break track.

In some gimbaled systems, even after the receiver lock-on and enters track mode, the receiver could be offset from the target LOS to point a higher SNR channel at the target than the primary channel.

The detection process is preferably configurable to allow any digital channel (e.g. digital pulse detector) to be activated or deactivated interactively by the processor based on an a priori LOS estimate of the target or LOS estimates with time and the observed (measured) EM signal parameters with respect to LOS of the receiver platform to the target. Down selection to the subset of channel(s) expected to have the highest SNR can reduce susceptibility to false alarms and jammers. Typically the individual channels will be deactivated from detection upon establishment of signal track (e.g. align boresight of the receiver with the LOS of the platform at the target) and only the primary sum channel will remain active for detection. Alternately, the sensor on the platform may be steered so that an individual channel or a secondary sum channel, which exhibit higher peak SNR than the primary sum channel albeit for a narrower FOV, is pointed at the estimated position of the target (e.g. offset receiver boresight from the platform LOS and target). If an individual channel is deactivated from pulse detection, the channel is still sampled and stored for LOS processing.

Many systems have an estimate of where the target is located and where the sensor host platform is located as well as the Roll, Pitch & Heading of the host platform and EM sensor. Together these provide an estimate of where in the Azimuth and Elevation FOV of where the signal of interest (target) is located and therefore which channels or sun channels should have the best SNR. Some systems (e.g. gimbaled systems) are able to steer the sensor and point the highest sensitivity point in the sensor toward the expected target location.

Sometimes this estimate is somewhat coarse. But if for instance the target is believed to be down then the platform can point the sensor slightly up to ensure that the target appears at a negative elevation angle and thus activate the dual sum channel that points down and the two individual channels that point down but deactivate the other channels until track is established.

If the system does not have this information a priori then the detection process can still be modified after track is established to select only the best combination of channels and sum channels to minimize false alarms and jammer susceptibility. Normally after track is established the target is centered in the detector FOV and the primary channel becomes the best SNR choice and the other channels can be turned off. Before the signal reaches a sufficient SNR to track on the sum channel a technique called "offset track" can be used when the sensor can be offset relative the direction of platform motion or the optics of the sensor has a wide FOV (with lower LOS accuracy).

An embedded signal processor 88 processes the stored amplitude samples to perform a time-correlation of the expected pulse rate interval (PRI) to the detected pulses, determine a strongest SNR channel for each pulse and apply pulse discrimination logic (PDL) to the pulses (described below with reference to FIGS. 7a and 7b) and finally to perform a LOS calculation on the multiple amplitude samples for the surviving EM pulses (described below with reference to FIGS. 11 through 15). The results of operating from an all-digital platform that facilitates additional signal processing include a more accurate and reliable detection and capture of EM pulses and a more accurate estimate of the peak value of the underlying analog signals from which to calculate the LOS. Consequently, target report 58 passed onto the command and guidance process is both more accurate and more reliable. As mentioned previously, for clarity the functionality and digital components are illustrated separately but are all suitably integrated into a single embedded signal processor 88.

Figure 6:
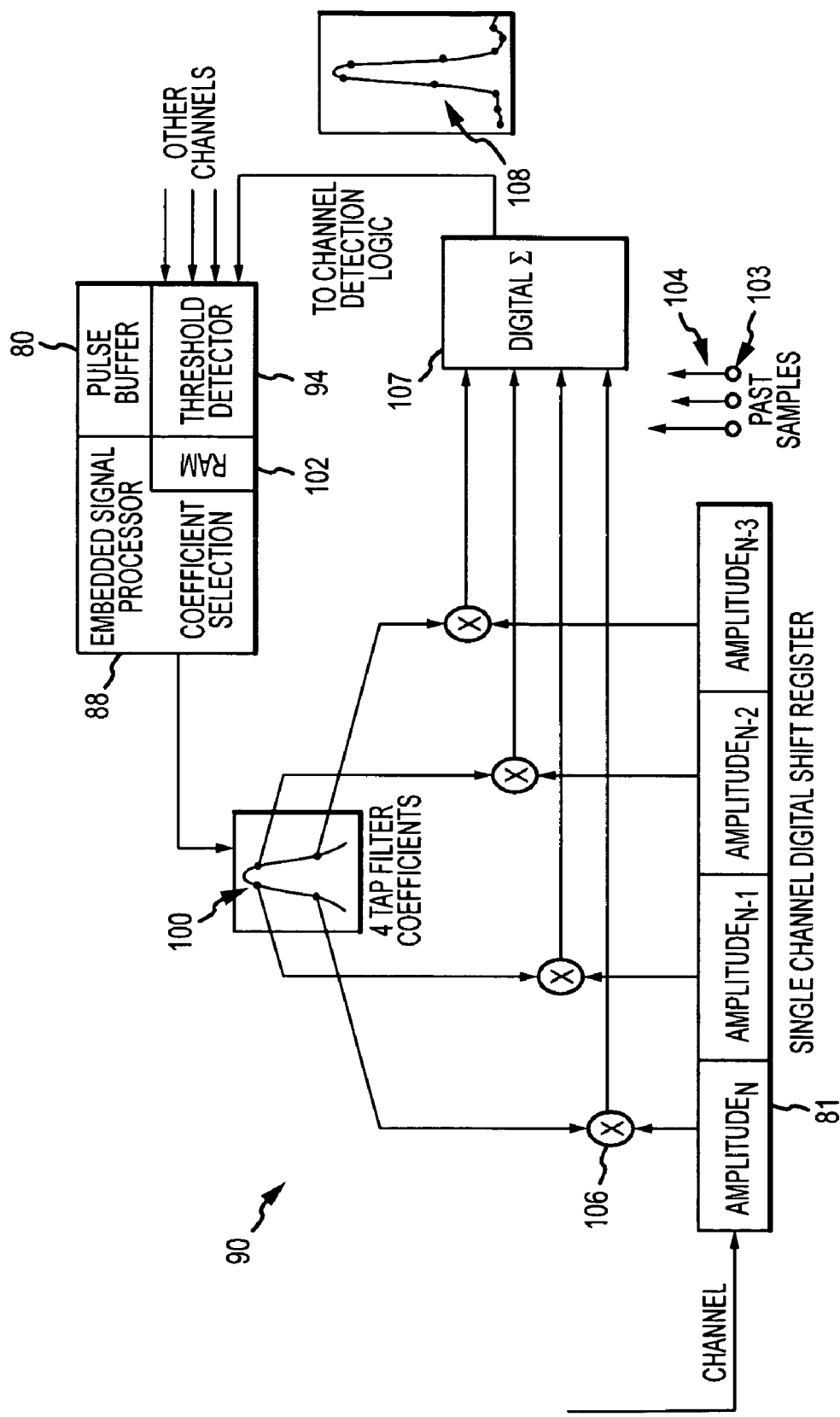
FIG. 6 is a diagram of an FIR matched filter.

As shown in FIG. 6, an exemplary embodiment of matched filter 90 comprises a 4-tap FIR filter. The filter coefficients 100 are stored in memory 102 in embedded processor 88. The initial coefficients are dictated by identification of the preferred source. The exact coefficients will vary somewhat for each specific source and change with temperature and other environmental factors. As pulses are captured and tracked, the embedded processor can adjust the filter coefficients to the characteristics of the received pulses. As the digital samples 103 for each channel pass through the digital shift registers 81, the sample amplitudes 104 are digitally multiplied (digital multiplier 106) by the respective filter coefficients. Digital summer 107 sums the weighted sample amplitudes to output the filtered digital signal that is passed to the threshold detector 94 (shown here with pulse buffer 80 integrated with embedded processor 88). When matched filter 90 coincides with an EM pulse, the amplitude of the output pulse 108 is increased. The effect is to increase the SNR of pulse detection.

Figure 7A:
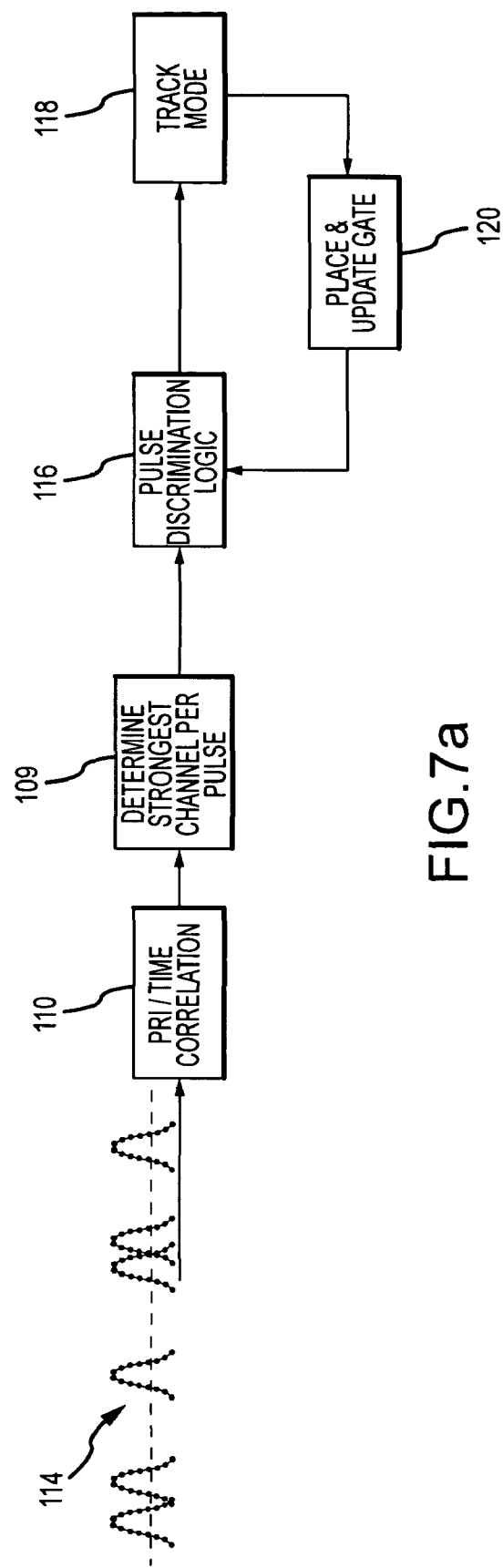
FIGS. 7a and 7b are a flow diagram and a plot illustrating PRI/time correlation for acquiring pulse sequences for a known laser source.

Pulse detection and capture merely identifies digital samples above threshold which might be pulses. Additional processing is required to separate true EM pulses returned from a target from false pulses due to background noise or active jamming. As will be described subsequently in reference to FIGS. 16-18, a notch filter (not shown) is used to remove pulses at repetitions frequencies more than an octave above that of the EM pulses. As shown in FIG. 7a, with knowledge of the EM source's pulse repetition interval (PRI) and the pulse shape, the embedded processor 88 performs a time-correlation 110 of the expected PRI 112 to the sequence of detected pulses 114 using track gates 115 to downselect to one or more candidate sequences, determines the strongest SNR channel for each pulse 109 and applies pulse discrimination logic (PDL) 116 to the pulses e.g. pulse width, rise and fall times, amplitude, LOS calculation etc. The processor evaluates both the time-correlation errors and discrimination errors to acquire a target sequence. Once the target is acquired, the processor enters track mode 118. The processor places and updates 120 track gate 115 (e.g. narrows the gate) to capture the next EM pulse. The placement and narrowing of the gate rejects false pulses without performing further correlation. If the track 'breaks', the processor will widen the track gate and restart the time-correlation. The initial width of the track gate is suitably set by the worst case time error of the EM source.

Figure 7B:
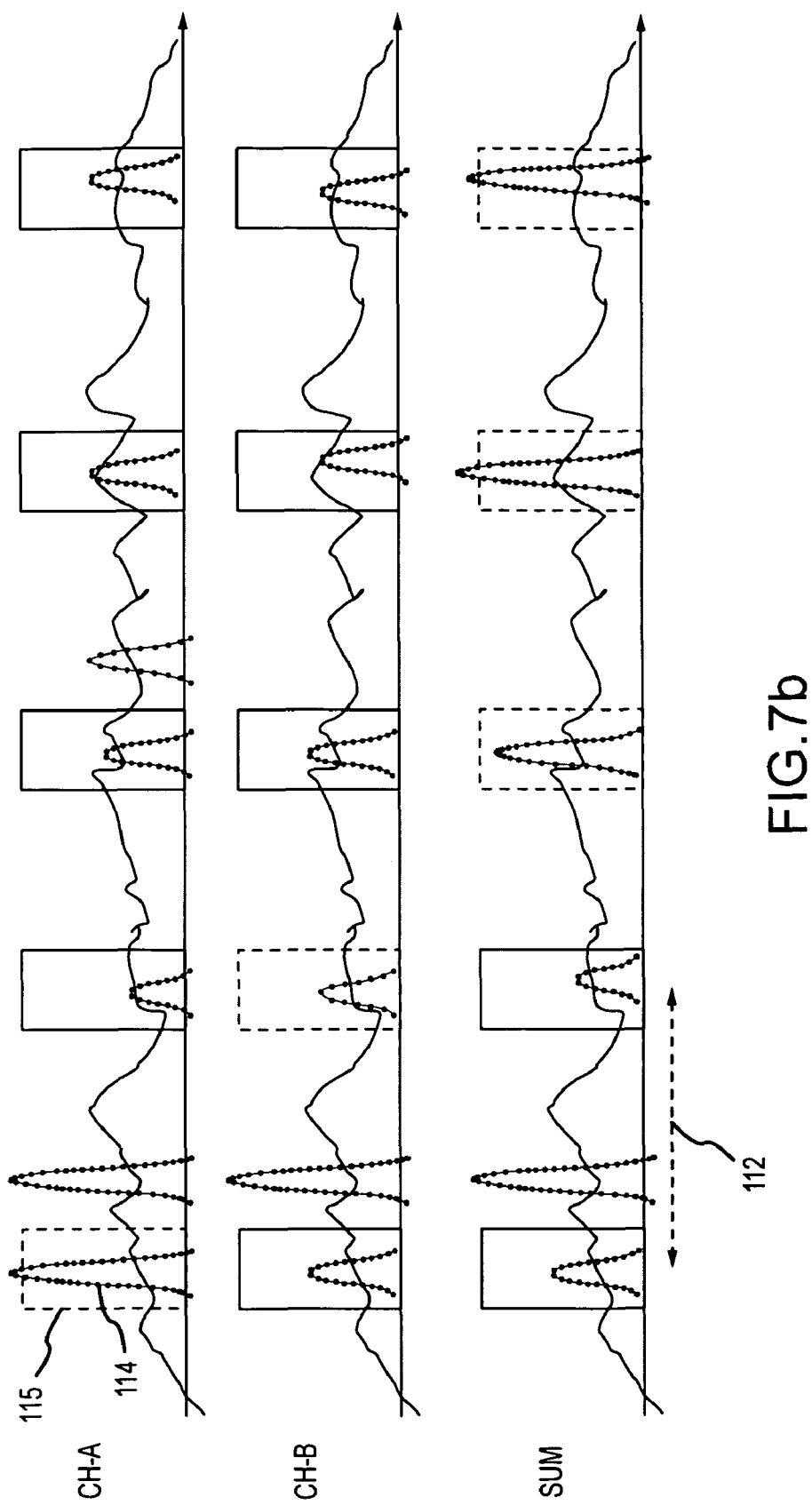

The all-digital LOS processor provides for distinct processing advantages over its mixed analog/digital counterpart. First, because the all-digital LOS processor detects pulses on multiple channels (e.g. all individual and sum channels or subsets thereof), allowing for selective activation and deactivation of any of the channels, the time-correlation and PDL can be performed on a strongest SNR channel for each detected pulse. As shown in FIG. 7b, the first detected EM pulse 114 is strongest in Channel A, the second detected EM pulse is strongest in Channel B and the third, fourth and fifth pulses are strongest in the primary Sum Channel. This example is merely illustrative to show the benefits of performing pulse detection on all channels and then selecting the strongest channel to process. One can readily see that prior to acquisition of the target track the strongest EM pulse return could jump from channel-to-channel. The time-correlation and PDL is thus enhanced by processing the strongest channel for each possible pulse. Second, because the all-digital LOS process stores multiple samples for each detected pulse the time-correlation can be performed before the PDL. This removes a large number of spurious pulses prior to the more computationally intensive pulse discrimination. This also allows for individual pulse parameters (e.g. LOS, PW, Rise Time, Fall Time, Pulse Amplitude and Delta Time from track gate center), joint pulse parameters and time-correlation errors to be combined into a more complete association error for acceptance or rejection of multiple pulses as a pulse train. Joint parameters may look at a uniformity metric of the individual pulse parameters over the pulse train e.g. variance of the pulse width, rise/fall times, amplitudes, LOS calculations etc. The incorporation of time-correlation and joint errors into the metric to declare a pulse a true EM pulse or to reject it as a false pulse has the dual beneficial effect of removing strong yet false pulses and retaining weak yet true pulses. The delay to store and process the samples in reverse order (time-correlation before PDL) is a small fraction of an EM pulse period. This delay is known and can be out put with the LOS calculations if desired. The result is that the all-digital LOS processor performs much better than its mixed analog/digital counterpart at efficiently eliminating false pulses and quickly acquiring and locking-on to true EM pulses.

The all-digital LOS processor architecture provides a platform in which EM pulses are detected and captured with greater efficiency and reliability than the mixed analog/digital architecture. Multiple samples are stored for each of the EM pulses to further facilitate a more accurate LOS calculation. The platform also facilitates additional digital signal processing to further improve pulse detection in noisy environments and when encountering active countermeasures.

Adaptive Pulse Detection Based on Channel Noise and CFAR

The initial detection and capture of pulses is important to the overall performance of the LOS processor. Pulse detection is based on a simple comparison of the sample amplitude to a threshold. If the amplitude exceeds the threshold the sample is declared a "pulse" sample, otherwise it is a "noise" sample. Although the downstream time-correlation and PDL can extract sequences of EM pulses from among noise or jamming pulses, we want to limit the number of non-EM pulses that are initially detected. These unwanted pulses can fill the buffer or restrict throughput of the processor. In extreme cases, real EM pulses may not be able to be saved in the buffer or, if saved, there may be an unacceptable delay in processing all of the pulses to acquire the EM pulse train and perform the LOS calculation.

The basic trade-off is simple. Setting the threshold higher reduces the number of pulses that will be detected. This reduces both the probability of a true EM pulse detection and the probability of a false alarm. Conventional systems define acceptable maximum and minimum detections (counts) over a fixed period, typically a few repetition intervals, to maintain a CFAR The processor counts the number of pulse detections over the fixed period. At the end of the period, if the count exceeds the maximum the processor increases the CFAR Factor thereby increasing the threshold. If at the end of the period, the count is less than the minimum the processor reduces the CFAR Factor to reduce the threshold. If the count is between the minimum and maximum the CFAR Factor is unchanged.

In the instant application this approach has two drawbacks. First, updates to the threshold are based solely on detected pulses at the current threshold and not the characteristics of the entire signal. Second, the updates to the CFAR Factor are relatively slow. In particular, if a large number of pulses are detected (e.g. jamming) the processor will wait until the end of the period to adjust the CFAR Factor. The buffer may be overwhelmed before the threshold reacts. Consequently, the detection thresholds are not sufficiently responsive to either the noise characteristics of the individual channels or a burst of detected pulses.

To address these issues, the LOS processor suitably sets each channel threshold as a function of the channel noise statistics and a modified CFAR algorithm that increases the CFAR Factor as soon as the max count is reached instead of waiting until the end of the fixed period. Similarly, the recovery from a high threshold can be accelerated by observing sub-periods and if no pulses (more generally less than a minimum) are detected aggressively reducing the CFAR Factor. The noise statistics are updated multiple times per pulse repetition interval. The base time scale (e.g. fixed period) of the CFAR Factor update is much slower, typically ¼ to 2 PRIs. However, the actual time scale may be comparable since the algorithm will update the CFAR factor as soon as the count exceeds the maximum and reset the fixed period. This approach reduces reaction time for a sudden change in noise level or pulse detection frequency to less than one PRI. Furthermore, the sensitivity performance is gracefully reduced with an increase in noise for a single channel of hardware. The all-digital LOS processor architecture provides the platform for calculating the noise statistics and updating the threshold in real-time and for modifying the CFAR algorithm.

In an embodiment, the detection threshold is set as follows:

Threshold(i)=Mean(i)+CFAR Factor(i)*Noise(i) for i=A, B, C, D and Sum Channels where mean(i) is the mean or DC value of a set of samples used to compute Noise (i). The CFAR takes into account issues that violate the Gaussian noise model e.g. jamming, processor failure, etc., typically used to characterize a channel. If you assume a Gaussian noise model than the CFAR term may be replaced with a constant multiplier derived from the model.

The benefits of adapting the detection threshold as a function of both channel statistics and a modified CFAR are illustrated in the simple examples shown in FIGS. 8a and 8c for a single PRI 130 between N and N−1 EM pulses 132 and 134 with channel noise 136. For purposes of comparison it is useful to note that the conventional CFAR algorithm that evaluates the min and max counts at the end of a fixed period of a couple of PRIs would not update the threshold within the interval. The described approach updates the threshold multiple times within each PRI based on the noise statistics and CFAR.

For purposes of illustration and example only, we assume that there are 5,000,000 digital samples per pulse repetition interval 130 and that the noise statistics are computed on every $13^{th}$ block of 1024 samples or 375 times per pulse interval and assume that the CFAR fixed period is ½ PRI. For example, a near IR laser source having a PRI of approximately 5 ms with an A/D clock of 100 MBS produces about 5,000,000 samples per PRI. The noise is updated approximately every 0.1 msec. The CFAR period may be 2.5-10 msec but the CFAR factor may be updated at a fraction of the fixed period, possibly on the same time-scale as the noise. The PRI, CFAR period and the number of times the noise and CFAR are updated per PRI will depend on the source repetition interval, the A/D sampling rate, buffer capacity and processor speed. At a minimum, the processor will update the noise multiple times per PRI and will be capable of sub-PRI adjustments to the CFAR Factor. The CFAR period may be greater than one PRI but the processor can respond more aggressively.

FIG. 8a illustrates the reaction of the threshold 138 to an increase in channel noise 136. The noise statistic, hence threshold is updated very rapidly so that the threshold tracks the rise and fall of the noise. This limits the number of false detections due to noise while preserving detection of strong pulses such as 132 and 134 above the noise floor.

FIG. 8b illustrates the reaction of the threshold 138 to the occurrence of a burst of jamming pulses 140. The burst of jamming pulses quickly exceeds the "max count" of the CFAR causing the threshold 138 to be increased and the fixed period reset. In this example, the threshold is increased and the period reset four times in less than one fixed period at a rate proportional to the jamming pulse rate. This rapid reaction prevents most of the jamming pulses from being detected and thus filling the buffer and occupying the processor.

FIG. 8c illustrates two different cases for the recovery of the threshold after the burst of jamming pulses 140 and rapid increase in the threshold 138. In the first case, which is not depicted by this example, there are pulses detected within the ½ PRI fixed period but the number of pulses due to the high threshold is less than the minimum count at the end of the fixed period causing the CFAR factor, hence threshold 138a to be reduced. This is the conventional approach to lower the threshold. In the second case, which is depicted by this example, there are no pulses detected for a sub-period (½ the fixed period as shown here) because of the high threshold. Because no pulses are detected over this sub-period, the processor reduces the CFAR Factor, hence threshold 138b sooner and more aggressively. Which of the two cases applies at any one time will depend on how high the threshold was raised, the noise characteristics and the pulse activity. This approach provides for a more responsive recovery of the CFAR Factor.

Figure 9:
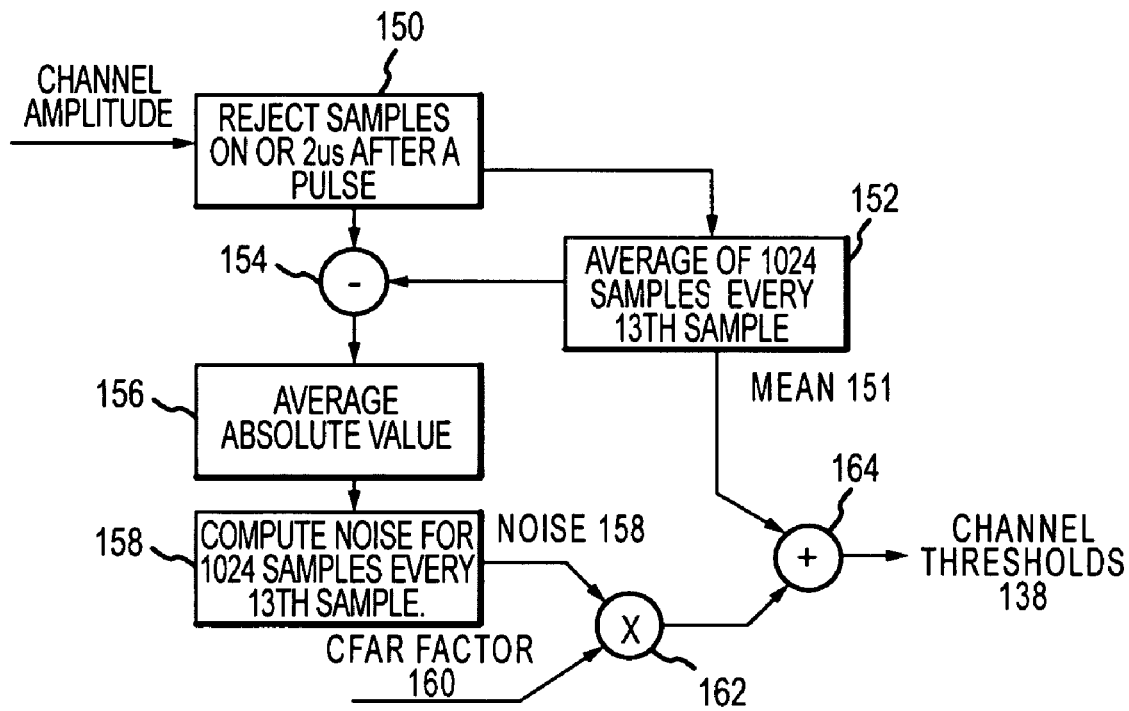
FIG. 9 is a block diagram illustrating the real-time calculation of the adaptive threshold.
Figure 10:
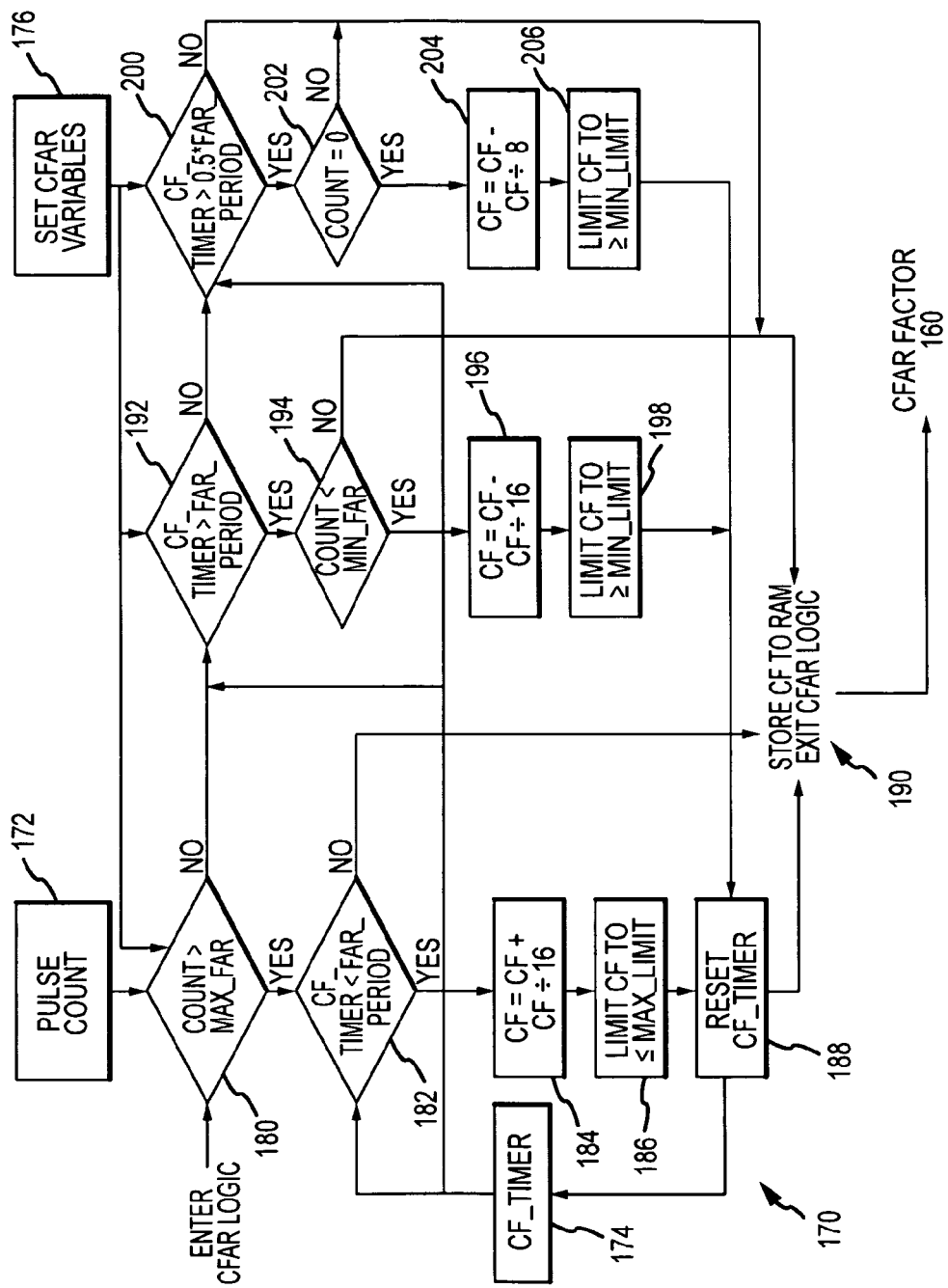
FIG. 10 is a block diagram illustrating the calculation of the CFAR as pulses are detected.
Figure 11A:
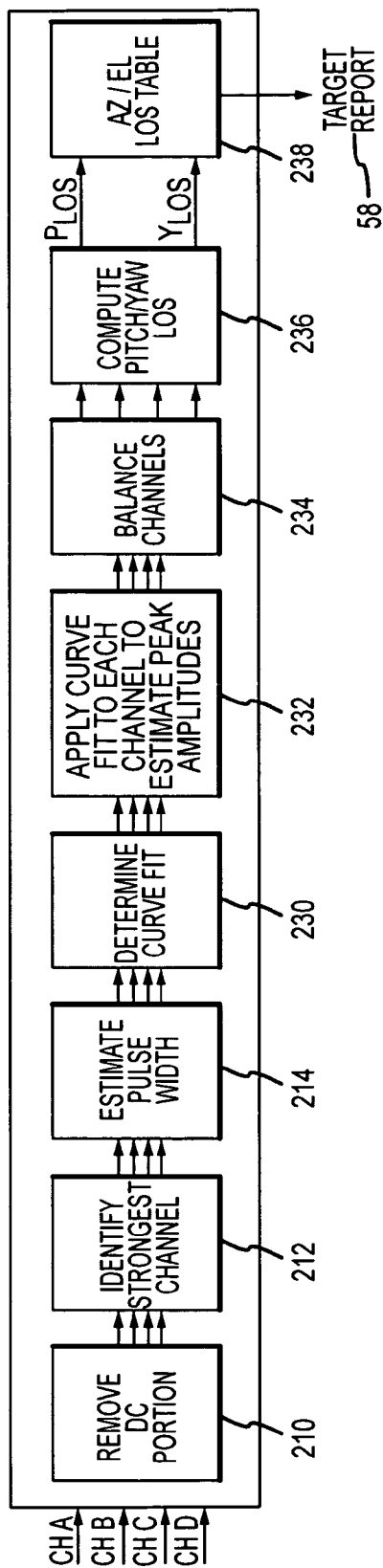
FIGS. 11a and 11b are a block diagram and illustration of the LOS calculation of LOS based on four good channels
Figure 11B:
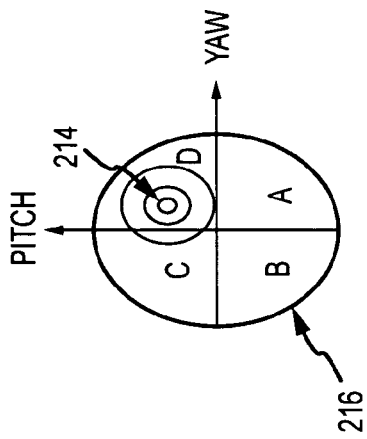

An embodiment for updating the threshold for a channel is shown in FIGS. 9 and 10. FIG. 9 illustrates the computation of the mean and noise statistics and the updating of the threshold. FIG. 10 illustrates an embodiment for updating the CFAR Factor. Either or both processes may be implemented in the embedded signal processor or in separate digital processors. The noise, CFAR Factor and threshold are updated on all channels simultaneously in real-time.

As shown in FIG. 9, the match filtered channel data is continuously fed into the adaptive thresholding process. The first step is to remove all of the "pulse" samples that lie above the current threshold. In this embodiment this is accomplished by rejecting all samples on or 2 us after a detected pulse (step 150). Every 13$^{th}$ amplitude sample is accumulated in a summation of 1024 samples and averaged to generate a mean 151 (step 152). The mean is subtracted (step 154) from the next 1024 samples and the average absolute value is calculated (step 156). The channel noise 158 is then computed as an approximated standard deviation (1.25*mean (absolute(amplitude values−previous mean))) of the 13*1024 samples after the estimated mean from the previous 13*1024 samples is removed (step 148). The processor that receives this estimate of noise level can further filter it in time. The channel noise 158 is multiplied by the CFAR Factor 160 (step 162) and added (step 164) to the mean 151 to update the channel threshold 138. This is just one example of how the noise statistic may be calculated. The important point is that a noise statistic is calculated for each channel and is updated many times per PRI so that the threshold reacts quickly to changes in channel noise.

As shown in FIG. 10, the CFAR logic 170 has two inputs; the pulse count 172 and CF_timer 174 (time since period was reset) and a number of variables 176 including the maximum count (Max_FAR), minimum count (Min_FAR), the fixed period (FAR_Period) and executes three separate tests to determine if the Max_FAR has been exceeded at any point within the FAR_Period, if the Min_FAR has not been reached at the end of the FAR_Period and whether no pulses have been counted in a sub-period (½ the FAR_Period in this example) to output the updated CFAR Factor (CF). The CFAR variables are application dependent.

The embedded processor enters the CFAR logic to first determine whether the pulse count exceeds the Max_FAR (step 180). If yes, the logic determines whether the time is within the FAR_Period (step 182). If no, the logic exits. If yes, the CF is incremented by $\frac{1}{16}^{th}$ of the current CF (step 184). The ratio can be set to other values. The logic limits the CF to a Max_Limit (step 186), resets the CF_Timer (step 188), stores the CF to RAM (step 190) and exits the CFAR logic to output the updated CFAR Factor 160.

If the pulse count does not exceed the Max_FAR, the logic determines whether the FAR_Period has expired (step 192). If yes, the logic determines whether the pulse count is less than Min_FAR (step 194). If no, the logic exits. If yes, the CF is decremented by $\frac{1}{16}^{th}$ of the current CF (step 196). The ratio can be set to other values. The logic limits the CF to a Min_Limit (step 198), resets the CF_Timer (step 188), stores the CF to RAM (step 190) and exits the CFAR logic to output the updated CFAR Factor 160.

If the FAR_Period has not expired, the logic determines whether a defined sub-period, here ½ the FAR_Period, has expired (step 200). If no, the logic exits. If yes, the logic checks to see if no pulses have been detected (step 202). If yes, the CF is decremented by $\frac{1}{8}^{th}$ of the current CF (step 204). Essentially, if no pulses are detected over this sub-period, the logic more aggressively reduces CF in both time and amplitude. Again, the logic limits the CF to a Min_Limit (step 206), resets the CF_Timer (step 188), stores the CF to RAM (step 190) and exits the CFAR logic to output the updated CFAR Factor 160.

Enhanced LOS Processing

The all-digital LOS processor architecture provides a platform for enhanced LOS processing beyond simply accepting the four maximum values for the individual quad channels captured upon detection of a pulse. Upon detection of a pulse, the memory controller stores a plurality of samples for each channel in memory. The plurality of samples comprises all "pulse" samples with amplitudes above the threshold and a number of leading and lagging samples with amplitudes below the threshold. In one embodiment, the three leading samples are stored and the lagging samples are stored until three in a row lie below the threshold. Depending on the strength of the captured pulse and the threshold, these leading and lagging samples may capture pulse energy as well as noise. The processor estimates a pulse width and fits a curve to the stored amplitude samples based on logic and a scale factor dictated by the pulse width to estimate a peak amplitude for each individual channel and calculates a LOS to the target from the estimated peak amplitudes. The processor is configured to select the strongest SNR channel (used to detect pulses) to determine the scale factor, the samples processed and the controlling logic. These parameters are then applied to all individual channels. The result is that the estimated peak amplitudes more accurately represent the peak amplitudes of the sampled analog pulse waveforms, hence the LOS calculation is more accurate.

As shown in FIGS. 11a-11b and 12a-12b, the embedded processor is configured to perform enhanced LOS processing on the unfiltered digital data on the individual channels. The processor removes the DC portion from the raw digital data (step 210) and identifies the strongest channel for each pulse (step 212). The strongest channel may have been determined upon initial pulse detection and saved as an index or by simply selecting the channel with the largest SNR In this example, the returned EM pulse spot 214 lies primarily in Channel D of quad-detector 216, hence Channel D is the strongest The processor may recreate the primary and/or secondary sum channel(s) from the individual channels either to determine the strongest channel or, if designated by the index as a sum channel, to use the selected sum channel to determine the pulse width, samples processed and logic employed.

Figure 12A:
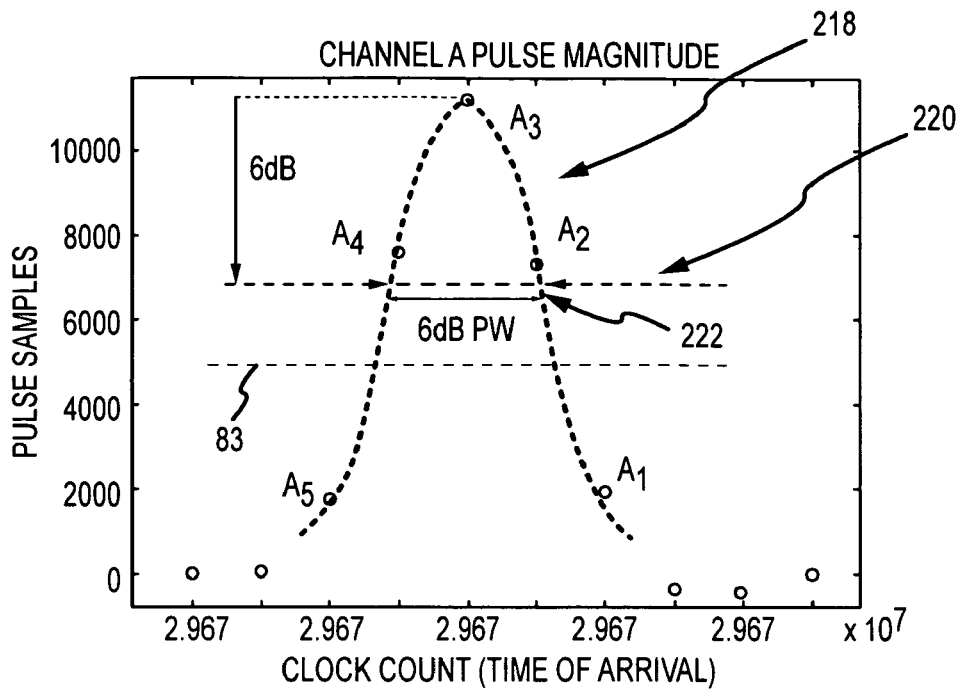
FIGS. 12a and 12b illustrate an energy based approach for pulse width estimation.
Figure 12B:
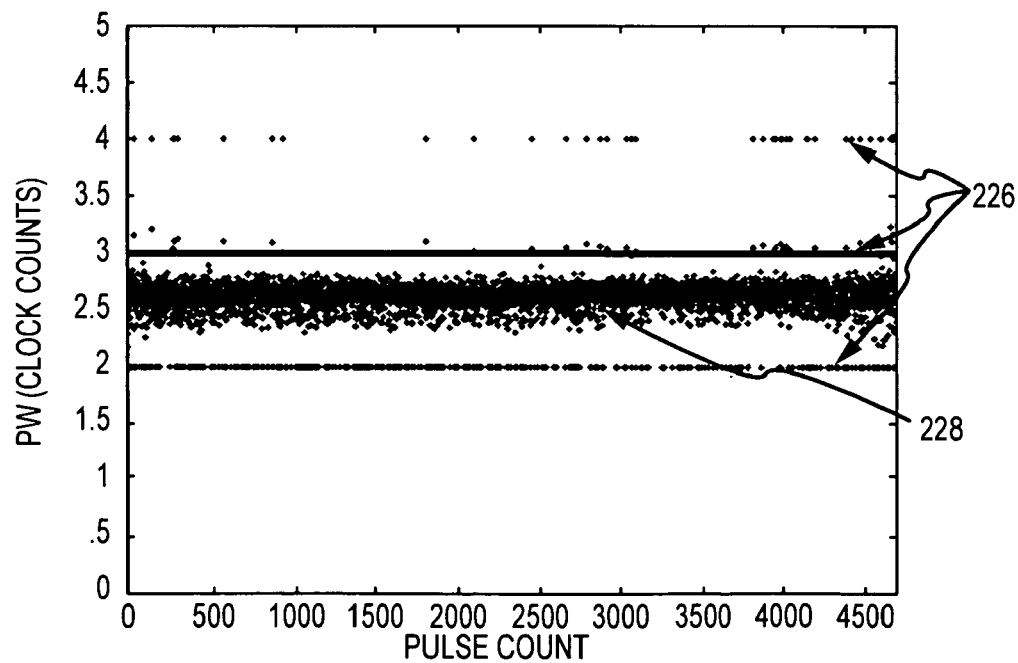

As shown in FIG. 12a, forward sample A1, pulse samples A2, A3 and A4 and trailing sample A5 that sample an EM pulse 218 above and below a pulse width threshold 220 (e.g. 6 dB down from the max sample amplitude) are stored in memory. The processor calculates a pulse width 222 for the pulse (step 224). A known way to estimate pulse width is to simply multiple the number of pulse samples by the sampling period. As shown in FIG. 12b, when computed for a large number of pulses this produces a pulse width estimate 226 that is neither accurate nor consistent. A preferred approach is to use the amplitudes of both the pulse samples and weighted amplitudes of the forward/trailing samples to estimate the pulse width as the ratio of the pulse power to the peak energy. For example, pulse width=((A1/2)+A2+A3+A4+(A5/2))*T/A3 where T is the sampling period. In this example, the contributions of the forward and trailing samples are weighted by a factor of ½. The pulse width estimates 228 are more accurate and more consistent.

Note, the pulse and forward/trailing samples are not necessarily aligned with the pulse and leading/lagging samples referenced to the detection threshold 83, which may be higher or lower than threshold 220. Those samples are stored in memory for each channel to create a pool of samples from which to calculate the pulse width. The forward and trailing samples are likely selected from the pool of leading/lagging samples but not necessarily. If the pulse is very strong and/or the detection threshold relatively low, the forward/trailing samples may actually lie above the detection threshold.

Using the estimated pulse width to determine a scale factor, the processor performs a curve fit to the stored samples (step 230). The curve fit may be a conventional linear curve fit to an $N^{th}$ order polynomial or an alternate linearization of a curve fit algorithm detailed in FIG. 13. For the same number of calculations, the latter approach provides a more accurate estimate of the peak. Essentially, the latter approach looks at the two samples with the largest amplitudes for the strongest SNR channel. If one amplitude is considerably greater than the other, the larger amplitude is probably very close to the peak amplitude of the underlying analog signal. As shown in FIG. 12a, A3 is considerably larger than A4. In this case, either the larger amplitude is accepted as the estimate of the peak or increased by a small scale factor. If the two amplitudes are close, the peak amplitude of the underlying analog signal lies approximately at a mid-point in time between the two samples. In this case, the larger amplitude is adjusted by a larger scale factor. For example, if sample A3 did not exist then A2 and A4 are very close and A4 would be adjusted by a large scale factor to estimate the peak of the underlying pulse 218 lying approximately at their mid-point in time. The strongest channel is used to select the two samples with the largest amplitudes, select averaging logic or the described curve fit logic and to provide the scale factor for the curve fit logic.

The processor applies the curve fit to each channel to estimate four peak amplitudes (step 232). The curve fit is applied to the same samples in all channels as dictated by the curve fit to the strongest SNR channel. These samples may or may not be the same time samples that would have been selected if each channel were curve fit independently. The processor adjusts the individual channel gains to balance the channels (step 234) and computes the Pitch_LOS and Yaw_LOS as functions of the estimated peak values (step 236). The Pitch_LOS is given by ((C+D)−(A+B))/(A+B+C+D) and the Yaw_LOS is given by ((A+D)−(B+C))/(A+B+C+D). The Yaw and Pitch LOS pair is an excellent error signal to drive an active control loop for centering the detector field of view on the EM signals' physical position (bore-sighting). However, because of non-uniformities and asymmetries in the detector, Yaw and Pitch LOS does not perform optimally as a true Pitch and Yaw measurement since the slope of LOS versus true angle changes as a function of angle. The non-linear transfer function of true angle versus the LOS measurements is mapped in a final AZ/EL LOS table (step 238). The Pitch and Yaw LOS measurements are indexes into the table lookup and the output of the table is corrected Azimuth (AZ) and Elevation (EL) angles which is then output in the target report 58.

Figure 13:
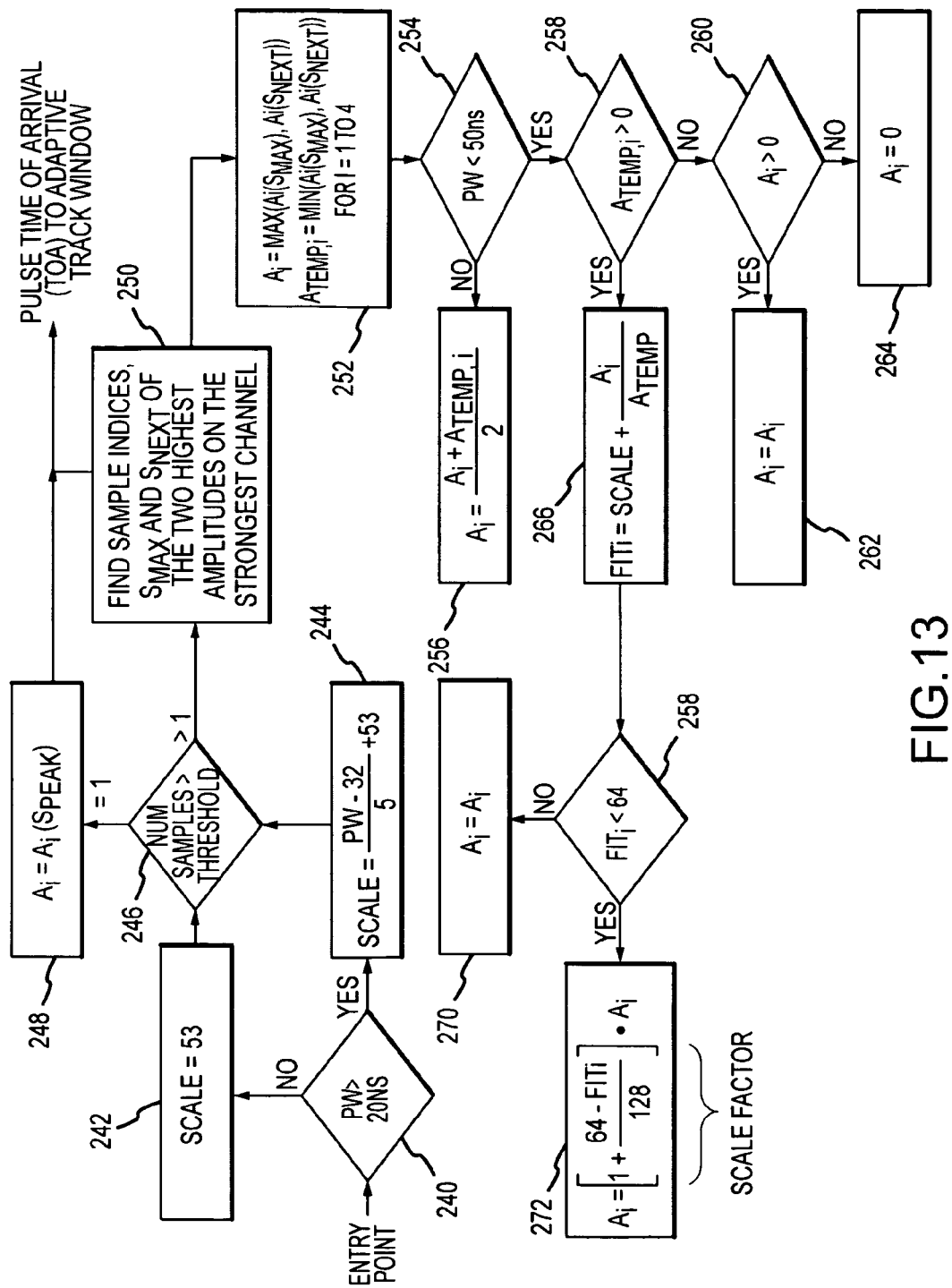
FIG. 13 is a diagram of a curve fit technique for estimating the peak pulse value; and an alternative calculation of LOS enabled by the all-digital architecture if a channel is bad.

An embodiment of the logic for the linearization of the curve fit algorithm is shown in FIG. 13. The strongest SNR channel is used to select the two time samples from which the peak is estimated, to select the logic for estimating the peak based on the pulse width calculated from the strongest channel and to set the scale factor for the expanded curve fit option. The individual channels provide only their specific amplitudes for the two selected time samples.

The embedded processor first compares the pulse width measured on the strongest channel against a threshold e.g. 20 ns (step 240). If the pulse is narrow, a scale term is set to a constant e.g. 53 (step 242). If the pulse is narrow, the scale term is scaled up from the constant to a maximum value e.g. 64 (step 244). For example, Scale=(PW−32)/5+53 where PW is measured in nanoseconds with a scale factor of 8/5 applied (i.e. a value of 32 represents 20 ns). The thresholds and constants here are only exemplary for a specific application.

The processor determines whether there are multiple samples that exceed the threshold on the strongest SNR channel (step 246). If not, the index $S_{peak}$ is selected and used for each channel e.g. $A_i=A_i(S_{peak})$ for i=1 to 4 (e.g. channels A, B, C, D) (step 248). The pulse time of arrival of sample $S_{peak}$ forwarded to the time-correlation and tracking routines as an offset from the first detected pulse on any channel in order to track based on the peak sample of the strongest channel. If yes, the processor identifies the strongest channel's highest and next highest amplitude values and saves their sample indices $S_{max}$ and $S_{next}$, respectively (step 250). The pulse time of arrive for sample $S_{max}$ is forwarded. Note, the strongest channel may be any one of the four individual channels or any sum channel.

Once the two sample indices $S_{max}$ and $S_{next}$ are selected, the logic allows each individual channel to determine which sample corresponds to the highest and next highest amplitude values e.g. flip the indices. The value $A_i$ is set equal to the maximum amplitude for the pair of indices and a value $A_{temp,i}$ is set equal to the minimum amplitude (step 252). The same two indexed samples are used for all channels to prevent a larger than normal noise sample from being selected as the peak on a channel with a weak signal and distorting the amplitude measurement. The hardware time alignment from channel-to-channel is substantially less than one time sample to support this decision.

The processor then checks to see whether the pulse width of the strongest SNR channel is less than a second higher threshold e.g. 50 ns (step 254). The threshold is set based on knowledge of the sampling time interval of the A/D converters to distinguish wide pulses with multiple samples near the peak from narrow pulses. If the pulse width is greater than the threshold of 50 ns, the sampling interval is such that there should be two samples per channel that are near the peak of the pulse with a small amplitude difference relative to the expected noise magnitude. In this case, the sample with the larger amplitude has almost a 50% probability of actually being the smaller amplitude sample with more noise. If the pulse width is less than the threshold, the sampling interval is such that there can only be one sample near the peak of pulse. The strongest channel via the pulse width measurement determines the logic used to form the peak estimate; averaging logic for broad pulses and a linear curve fit logic for narrow pulses.

Therefore if the pulse width is greater than the threshold, the average logic dictates that the polynomial coefficients are 0.5 and 0.5, hence $A_i$ is calculated as the mean of $A_i$ and $A_{temp,i}$ (step 256) for each channel. The average gives a better estimate of the peak for wide pulses by reducing the variation from noise. The average is performed on the same two time samples for each channel, so if there is an offset from the peak produced, it shows up equally on all channels.

If the pulse width is less than the threshold, the curve fit logic expands the equations so that the peak estimate is $1.5*A_i-(Scale/128)*A_i^2/A_{temp,i}$ where Scale is chosen by the pulse width estimate of the strongest SNR channel in step 242 or 244. Instead of automatically applying the expanded curve fit equation to each channel, which could be done, the processor performs different intermediate tests on each channel to account for the effects of noise, particularly on relatively weak signals. The processor determines whether $A_{temp,i}$ has a positive value (step 258). If not, the processor determines whether $A_i$ has a positive value (step 260). If yes, the processor sets $A_i=A_i$ (step 262). If $A_i$ is less than zero the processor sets $A_i$ to zero (step 264). This determination is made for each channel. If the EM pulse signal on the channel is weak or the noise high, one or both amplitude samples can be negative and the channel peak will be determined with this logic. The processor also checks to see if all resulting peak amplitudes are negative (not shown). If the amplitude from the strongest channel comes out of these calculations as negative then it is assumed that there is a problem with calibration constants that are stored in the processor that created a negative offset on all data or that something in the processor has malfunctioned. In this case the smallest channel amplitude (most negative value) is subtracted from all the channel amplitudes, so the minimum value becomes zero and the remaining channel amplitudes are shifted to be positive.

If $A_{temp,i}$ is positive, the processor computes a fit parameter $FITi=SCALE*A_i/A_{temp,i}$ (step 266). The curve fit is scaled to have a max FITi of 64 for the narrowest expected pulse when sample $A_i$ is at the peak assuming no noise and a min FITi of 53 for broad pulses when the peak lies half-way between samples $A_i$ and $A_{temp,i}$. Noise can cause a channel to exceed this value by either increasing $A_i$ or decreasing $A_{temp,i}$. If FITi is not less than the max of 64 (step 268) the processor again simply selects the max amplitude and sets $A_i=A_i$ (step 270). The processor could be configured to skip step 268 and apply the curve fit equation regardless. If FITi>64, the curve fit equation will reduce the max sampled value $A_i$ on the assumption that the sample was inflated by noise. However, FITi is more sensitive to $A_{temp,i}$ being reduced by noise because it is in the divisor. Simulations have shown that clipping FITi at the max value of 64 and using the max sampled amplitude $A_i$ improves the accuracy of the LOS calculation. This test is applied per channel.

If FITi<64, the processor scales $A_i$ as follows: $A_i=[1+(64-FITi)/128]*A_i$ in accordance with the curve fit equations to estimate the peak (step 272). If FITi is close to the max value of 64 the max sampled value $A_i$ is increased only a small amount. If FITi is close to the min value of 53 the max sampled value $A_i$ is increased by a maximum amount. In other words, if the time sample $S_{max}$ is close to the actual peak of the underlying analog waveform and the pulse is narrow, the amount of correction if any is very small. If the time samples $S_{max}$ and $S_{next}$ occur at approximately ½ sampling period T on either side of the actual peak, the amount of correction is relatively large. For cases between these two extremes the curve fit equation varies the amount of correction.

Figure 14:
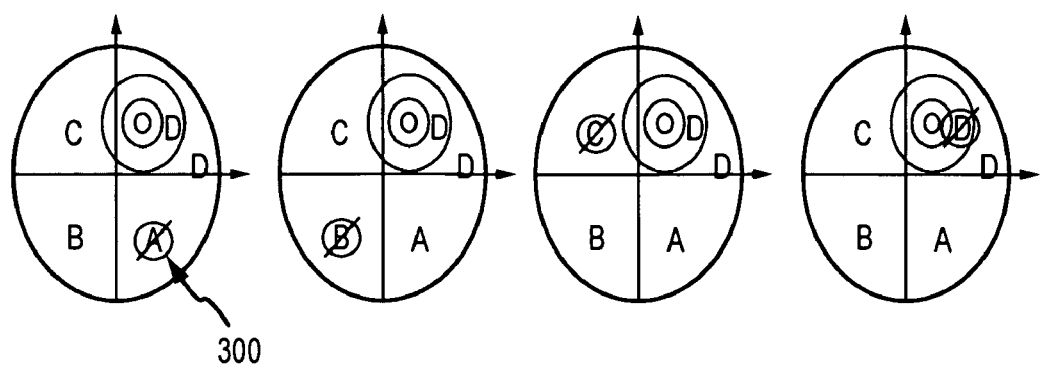
FIG. 14 is a diagram illustrating the LOS calculation assuming one channel is missing.

The all-digital LOS processor architecture provides flexibility to address special cases that may arise such as dropped channels or channel saturation. As shown in FIG. 14, the LOS processor can tolerate and adapt the LOS calculation for a single bad channel 300. One way to determine whether a channel is bad is to compare the channel noise (computed for the adaptive thresholding) to the channel noise of the other three channels. If the channel with the highest absolute deviation from the root-mean-squared (RMS) of the other three channels does not lie within upper and lower deviation limits it is declared a bad channel. The LOS calculations are adapted as follows:

Case 1. A Channel Missing

Pitch_LOS=(C−B)÷(C+B)

Yaw_LOS=(D−C)÷(D+C)

Case 2. B Channel Missing

Pitch_LOS=(D−A)÷(D+A)

Yaw_LOS=(D−C)÷(D+C)

Case 3. C Channel Missing

Pitch_LOS=(D−A)÷(D+A)

Yaw_LOS=(A−B)÷(A+B)

Case 4. D Channel Missing

Pitch_LOS=(C−B)÷(B+C)

Yaw_LOS=(A−B)÷(A+B)

Figure 15:
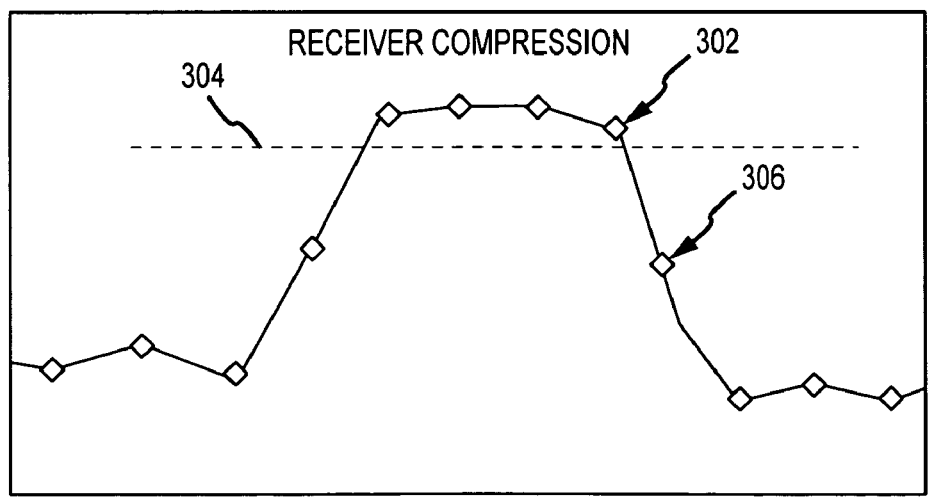
FIG. 15 is a diagram for estimating the peak pulse value in the event of channel saturation.

As shown in FIG. 15, if any one of the channels saturates (i.e. one or more samples 302 are above the saturation threshold 304 indicating those amplitudes have put the receiver hardware in compression or saturation and are therefore inaccurate) the curve fit algorithm is bypassed and the first unsaturated sample 306 prior to saturation is used as the peak estimate. The same time sample is used for each channel regardless of whether those channels are saturated or not. Although this approach lowers the SNR it still provides accurate LOS estimates because presumably to saturate the EM pulse, hence the first leading sample amplitude must be strong. This approach effectively extends the dynamic range of the LOS processor beyond the inherent limit of the receiver hardware.

Countermeasures

Broadly defined, countermeasures encompasses different techniques to differentiate "jammer" pulses from EM pulses from the known source and remove the jammer pulses as far upstream as possible to avoid overwhelming the memory or processor.

The Jammer is typically an EM source that is pointed at the ground at some standoff distance from a potential target. Consequently, the amplitude and the LOS of the reflected jammer pulses are very similar to the reflected source EM pulses. The mission of the jammer is not to obfuscate the real EM pulses but to either cause the processor to acquire and pursue a false track on the jammer pulses and/or to simply overwhelm the buffer and processor. Because memory and processor speed is available and inexpensive, the jammer must transmit pulses at a very high repetition rate in order to confuse or overwhelm the LOS processor.

Figure 16:
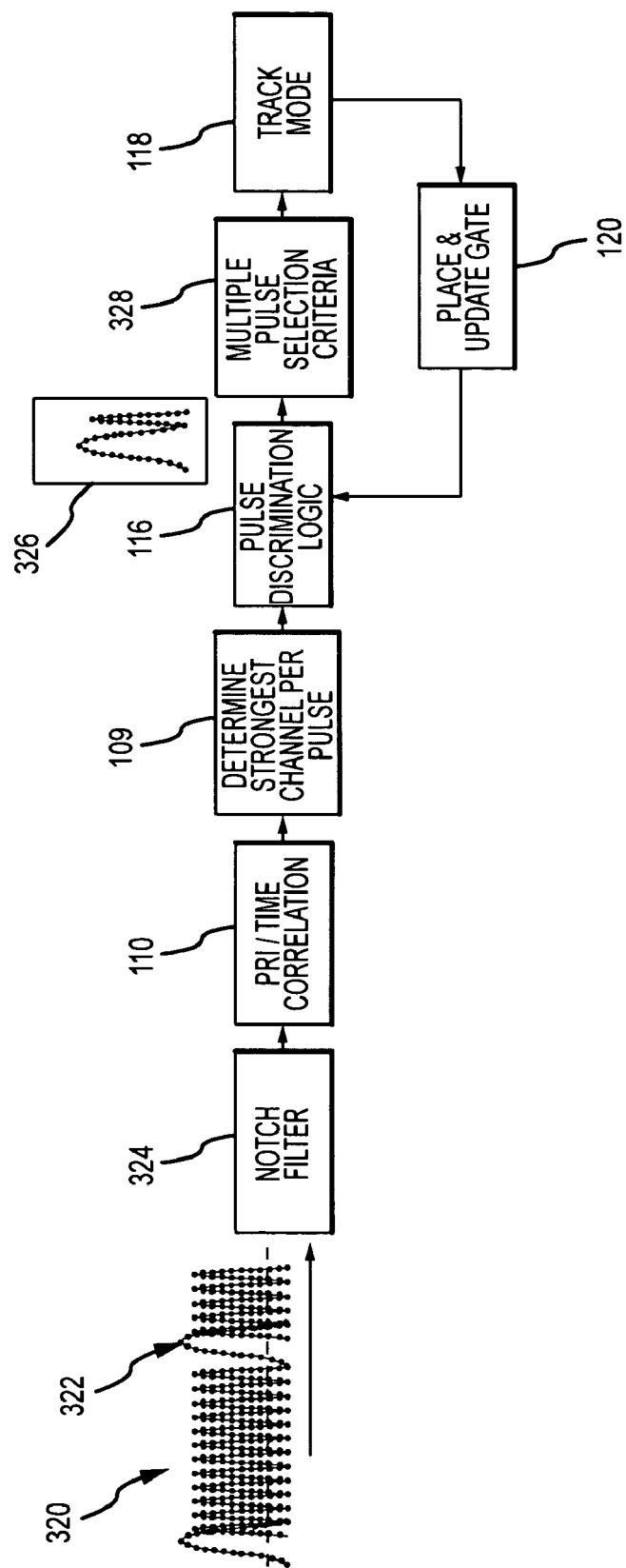
FIG. 16 is a flow diagram of an acquisition and track logic sequence including countermeasures to eliminate jamming pulses.

As shown in FIG. 16, the PRI Time correlation and PDL processing used to acquire and track a target (FIG. 7a) is augmented with certain countermeasures processing to differentiate the jammer pulses 320 from the EM source pulses 322 and remove them from the pulse train. The processor determines the strongest SNR channel for each pulse (step 109) and performs Pulse Discrimination 116 after the Notch Filter 324 and Time Correlation 110 processing. Because of the LOS similarity the strongest channel is most likely to be the same for the jammer and EM source pulses. The processor passes the pulse train through a notch filter 324 that is configured to remove pulse trains (single-frequency or pseudo-random) that occur at frequencies (repetition rates) greater than an octave above a known repetition rate of the EM source pulses. The notch filter is a simple technique to remove the bulk of the jammer pulses that might otherwise overwhelm the memory or processor.

PRI/Time correlation 110 is performed on the notch filtered pulse train that includes the EM source pulses 322 and any remaining jammer pulses 320 within an octave of the source frequency. Most of these jammer pulses do not pass the PRI/time correlation criteria unless their frequency is very close to the actual laser frequency, close enough that the processor thinks the jammer pulses are the EM source pulses. In some instances, jammer pulses that occur at approximately the same time as an EM pulse cannot be removed by the notch filter and appear in the time-correlation track gate with the EM pulse. The PDL 116 extracts features such as pulse width, rise/fall, time etc. for each of the one or more pulses 320 and 322 in the track gate 326. In addition to these standard criteria for determining whether a single pulse is or is not an EM source pulse or in the event that the standard criteria cannot distinguish the EM source and jammer pulses, the processor applies multiple pulse selection criteria 328 that look at the positions of the pulses in the track gate and the relative amplitudes of the pulses. The processor can be configured through an interactive digital user interface to expect the EM source pulse to have the largest amplitude, lie closest to the center of the track gate or be the first or last pulse within the track gate. The processor can use this information to either select a pulse directly or to augment the PDL to select a pulse. Once the target is acquired, the processor enters track mode 118. The processor places and updates 120 track gate 326 (e.g. narrows the gate) to capture the next EM pulse. The placement and narrowing of the gate makes it more difficult for jammer pulses to survive and eliminates the need to perform multiple pulse selection. If the track 'breaks', the processor will widen the track gate and restart the time-correlation. The initial width of the track gate is suitably set by the worst case time error of the EM source.

The technique for estimating the pulse width based on the ratio of the pulse energy to the peak power for the strongest SNR channel provides a more accurate pulse width measurement that can be used to improve different countermeasures. First, the improved pulse width measurement improves the upstream matched filtering of the digital signals. This further differentiates the EM source pulses from the jammer pulses making the removal of the jammer pulses simpler. Second, the improved pulse width measurement becomes a more powerful and reliable feature for the PDL to differentiate EM source pulses from jammer pulses. Lastly, if the pulse width is more accurately known the track gate can be sized and positioned more accurately thereby better excluding jammer pulses. The effect of PW accuracy on the gate will become more important as EM sources achieve reference oscillator performance that allows pulse interval stabilities to approach the width of a pulse.

The notch filter is particularly effective when used as a front-end process for adaptive thresholding based on both the CFAR and channel noise. If the notch filter effectively removes jammer pulses, the threshold processor will optimize the threshold to detect EM pulses to acquire and track the target. The removed jammer pulses are treated as if they never occurred and thus do not effect the CFAR Factor or threshold. If the notch filter cannot remove jammer pulses, the threshold process will react very quickly (e.g. much less than one repetition pulse interval of the EM pulses), treating the jammer pulses as noise or false-alarms, to raise the threshold to limit further detection of jammer pulses.

As shown in FIG. 17a, an embodiment of a notch filter to counter a single-frequency jammer looks for a three pulse sequence 330 that satisfies two criteria. First, are the three pulses equally spaced in time? Second, is that spacing less than half the minimum expected repetition interval of the EM source pulses? If both criteria are satisfied, the three pulse sequence is acquired as a jammer sequence and deleted from the acquisition buffer. After a tone (3 pulses) is identified the next time of arrival (with a notch gate 332) is projected into the future. If a pulse 334 is detected in the notch gate it is deleted from the acquisition buffer. The time of the last jammer pulse is used to update the expected time interval to project the next pulse and so on. The dashed lines indicate jammer pulses that have been removed. The solid lines indicate EM source pulses 336 that are not removed by the notch filter, which are then captured by the time-correlation process to acquire the target and to track source pulses that fall within the next track gate 338.

The jammer pulses are detected and stored in memory, but the notch filter processing is running at a speed that allows it to find the jammer with its first 3 pulses before the pulse memory can come close to filling up and before enough pulses are detected to trigger the CFAR pulse count that would cause an increase in the detection threshold. The jammer pulse rate is accounted for in the CFAR algorithm, which subtracts the expected number of jammer pulses from the total pulse count to get a count of non-notched pulses for the CFAR decision. After the notch filter locks on to a jammer, the notch filter runs fast enough to remove the jammer pulses one at a time before the next one arrives, so there is no more than one jammer pulse in the pulse buffer at any time. If the jammer was producing pulses fast enough to trigger the CFAR decision logic the jammer pulses would be accounted for and no threshold change would occur. The CFAR pulse count threshold is normally set to allow hundreds of jammer or noise pulses within one source pulse repetition interval (excluding some RF and MMW applications with a high pulse repetition frequency) since the time-correlation can handle a high noise detection rate before failing.

The notch filter only looks for pulse intervals that correspond to greater than an octave of frequency above the highest EM source pulse tone. Consequently, the notch filter does not effect the EM source pulse train directly (i.e. the notch processing does not lock onto the source's first harmonic). It is possible for an EM source pulse to fall at exactly the wrong point to confuse the notch filter, such that the EM source pulse is used as one of the 3 pulses to define the notched jammer signal. This is unlikely, less than a small percentage for the worst case when the jammer is right at the lowest acceptable jammer frequency, based on the size of the notch gate 332. Higher jammer frequencies have a lower probability of using an EM source pulse in the acquisition of the jammer because there are more jammer pulses within a source pulse interval. When an EM pulse is used to define a jammer then by restraining the frequency to greater than an octave above the EM source frequency then the next expected jammer pulse (fourth in the series) cannot be an EM source pulse given the EM source conforms to the expected pulse interval and maximum interval variation. This fourth pulse event will realign the expected jammer pulse sequence with the observed jammer time sequence. Also, the jammer pulse train is tracked by the notch filter so if it cannot be maintained (continued to be tracked), because of the error created in the defined jammer pulse interval by mistakenly using a source pulse, then the jammer track is aged out (eliminated) and the notch processing will have to re-lock onto the jammer Only one source pulse is lost in this event which is tolerated by the tracker. After a jammer is declared then a small percentage of source pulses are expected to be eliminated by the notch processing as it continues to filter out detections and this is also tolerated by the tracker.

As shown in FIG. 17*b*, an embodiment of a notch filter is configured to counter a jammer that transmits a pseudo-random pulse train. The jammer repeatedly transmits a string 340 of N pulses 342 (where N=3 in the example) that are randomly spaced within the string. In effect this creates N=3 pulse trains at the same frequency that are randomly shifted in time with respect to each other. The processor again looks for three pulse sequences that satisfy the spacing and frequency criteria to lock onto each of the N pulse trains. The implementation is a bit trickier to separate the multiple jammer pulse trains.

The processor creates a base pointer, for example to pulse #1 time of arrival (TOA). A second pointer starts at TOA #2 and a third points at TOA #3. The third pointer is incremented upward looking at the time difference between the pointer #3 and pointer #1 TOA's. If this time difference is less than half the expected laser PRI then the time of Pointer #2 is checked to see if it is midway between the two end times. If it is close to the center then a jammer track is begun. If it is not close then pointer #2 is incremented and another check of the mid point is made. This continues until pointer #2 points to a time past the mid point or until pointer #2 equals pointer #3, at which pointer #3 is incremented. Pointer #3 and #2 are moved in this manner until the difference between the time of Pointer #3 and Pointer #1 becomes greater than half the expected laser PRI and at this point the base pointer #1 is incremented and so on. This process is terminated after a set number of pulses have been processed. It is also repeated after a jammer is defined to try and establish track on another jammer from any pulses that are not eliminated by the previous defined jammer tracks. The repeat is terminated after a set number of jammers are defined. In this example, the processor acquires and removes three jammer tones leaving a train of EM source pulses 344.

This might appear to be more time consuming than just trying to correlate the time between the desired laser pulses, since the EM source time interval is known and this allows the pointers to be moved more effectively, but the jammer process is only executed once. If a jammer is tracked then the expected next pulse time of arrival for a jammer pulse is calculated, allowing the next pulse that arrives to be compared to this time and thus get removed in near real time without the processor having to store (keep) more than one jammer pulse sample. This makes for a more effective use of memory (it does not get filled up with jammer pulses before the required number of source pulses are received for correlation) and it produces a quicker source correlation process with fewer pulses to process which compensates for the time spent searching for jammers.

A more detailed presentation of the pulse acquisition and tracking process is illustrated in FIGS. 18*a* and 18*b* assuming the notch filter is running and all pulses in the pulse buffer are sequenced through to acquire and track the EM pulse source.

FIG. 18*a* depicts the functional transitions and data flow to acquire and track an EM pulse train. Signal search is begun (step 356) and a sequence of pulse Time of Arrivals that matches the expected Source time intervals constitutes a time correlation (step 345), which is followed by the calculation of a correlation error comprised of the pulse parameter errors (not shown) and time correlation error (TOA_Error). If this correlation error is below the EM Source specific correlation threshold then the laser is acquired and Track is begun (step 355). Three or more pulses can be used in the acquisition sequence and upon acquisition of the EM Source the adaptive gate parameters (Gate, Gate_Sum and Count) are initialized (step 346) and the parameters that constitute the track gate (T_Begin and T_End) for the next expected pulse are initialized (step 354).

Thereafter the Count, Gate_Sum, Gate, T_Begin and T_End parameters are updated for each subsequent tracked pulse to allow the track Gate width 370 to adapt (step 349) and either collapse or expand based upon the measured Time of Arrival error (step 357) as depicted in FIG. 18*b*.

While the track process waits for the next detected pulse, time is monitored to ensure the T_End time is not reached (step 347). If the processor clock indicates that time exceeds T_End while waiting for a pulse detection then "No Pulse" is declared and the track processor will coast to the next expected pulse (step 348). The coast process extends the expected TOA to the next expected pulse by adding the current Pulse Repetition Interval to both T_Begin and T_End. However, if the time since the last track pulse was detected has been too long (as measured by T_Begin minus the last tracked TOA) then track of the EM Source is terminated (step 348).

While waiting for a pulse detection event (step 347) and while time remains less than T_End and if a pulse is detected then the TOA for the pulse is compared to T_Begin and T_End. If the TOA is greater than T_End then the track process will coast to the next expected Time of Arrival or terminate track when the time since the last track pulse has been too long (step 348). If the TOA of the detected pulse is less than T_End and greater than T_Begin it is accepted based upon time correlation.

Before declaring the pulse as the next tracked pulse it must also pass other pulse discrimination constraints. To facilitate arbitration of multiple pulses within a track gate a track record that contains estimated pulse parameters is maintained by the track processor. Line of Sight, Pulse Width, Rise Time, Fall Time, next TOA Estimate and Estimated Amplitude are tracked (not shown) for each EM signal under track. These estimated pulse parameters are used to arbitrate between multiple pulses that fall in the same track gate (step 353). By implementing the arbitration function after time correlation, multiple track correlation schemes can be selected to arbitrate to a single pulse for the tracker update (step 358).

The pulse arbitration can be set to eliminate pulses that have measured pulse parameter errors above set thresholds when compared to the parameter estimates maintained in the track record. Also the pulse arbitration can be set to select the pulse with the smallest combined correlation error (step 359).

When the combined correlation error arbitration is not used then for arbitration of multiple pulses that remain after the parameter comparisons the arbitration can be set to select the pulse based upon relative position within the gate (step 353). The closest to the track gate center or the last pulse or the first pulse or the pulse with the maximum amplitude can be chosen per user setup prior to beginning the signal acquisition process.

When a pulse has been accepted in the arbitration process, the pulse parameters are updated and stored, but the arbitration process continues to evaluate future pulses for a better correlation error or a better position within the track gate (step 347). A better correlation error or position when compared to the previous best result is then saved as the last best correlation pulse. As the processor waits for the next pulse detection, if the processor time exceeds the T_End value indicating that no future pulses will correlate in time with the current track gate then the last best correlated pulse is used for the Tracker update.

The tracker update calculates the TOA_Error step (357) as the difference between the expected TOA (TOA_est) and the measured TOA for the current correlated pulse. This error is used to update the Gate width (step 349) and the TOA_est (step 350) for the next expected pulse arrival time. The track window parameters (T_End and T_Begin) are updated for the next pulse correlation process (step 351), the Line of Sight measurement is output (step 352) and the time correlation process is repeated to search for the next EM source pulse (step 347) to update and continue the track process.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A digital line-of-sight (LOS) processor for detecting electromagnetic (EM) pulses reflected off a target from a source that emits the EM pulses at known pulse repetition intervals and computing a LOS to the target, comprising:
   a plurality of A/D converters configured to convert respective analog signals from a multi-channel detector into a plurality of digital signals on respective individual channels;
   a digital summer configured to sum a plurality of said digital signals to produce a digital signal on a sum channel;
   at least one digital pulse detector configured to compares sample amplitudes of the digital signal on at least the sum channel to a detection threshold to detect pulses including pulse samples with amplitudes above the threshold and noise samples with amplitudes below the threshold;
   at least one threshold processor paired with said at least one digital pulse detector, said threshold processor configured to process the noise samples of at least the sum channel to estimate noise and update the detection threshold of the paired pulse detector as a function of the noise;
   a memory;
   a memory controller that upon detection of a pulse by any one of the one or more pulse detectors stores a plurality of samples for each said individual channel in said memory; and
   a processor that processes the sample amplitudes for the individual channels to calculate a LOS to a target.

2. The digital LOS processor of claim 1, wherein each said threshold processor updates the detection threshold multiple times per pulse repetition interval.

3. The digital LOS processor of claim 1, wherein each said threshold processor is configured to update the detection threshold as a function of the channel noise and a constant false-alarm rate (CFAR) factor.

4. The digital LOS processor of claim 3, wherein said embedded processor is configured to increase the CFAR factor as soon as a pulse count exceeds a maximum count defined for a fixed period and reset a count period.

5. The digital LOS processor of claim 4, wherein said embedded processor is configured to reduce the CFAR factor if the pulse count is less than a minimum count at the end of the fixed period and more aggressively reduce the CFAR factor if the pulse count is zero for a defined sub-period less than said fixed period.

6. The digital LOS processor of claim 3, wherein the CFAR factor is calculated for each channel separately.

7. The digital LOS processor of claim 3, wherein a single CFAR factor is calculated for the plurality of channels on which pulse detection is performed.

8. The digital LOS processor of claim 4, wherein the detection threshold is equal to the sample amplitude mean plus the produce of the channel noise and CFAR factor.

9. The digital LOS processor of claim 1, wherein each said threshold processor sums every Nth sample in a block of samples to generate a previous mean, subtracts the previous mean from the next block of samples, computes an average absolute value of those samples, and computes the estimated channel noise as an approximated standard deviation from the previous means and the average absolute value.

10. The digital LOS processor of claim 1, further comprising:
    a filter that removes pulses that occur at repetition rates greater than an octave above the repetition rate of the pulse repetition interval.

11. The digital LOS processor of claim 1, further comprising:
    a plurality of digital pulse detectors configured to compare sample amplitudes of the digital signals on the sum channel and each of the individual digital channels to respective detection thresholds to detect pulses including pulse samples with amplitudes above the threshold and noise samples with amplitudes below the threshold; and
    a plurality of threshold processors paired with said plurality of digital pulse detectors, each said threshold processor configured to process the noise samples of the associated channel to estimate noise and update the detection threshold of the paired pulse detector as a function of the noise.

12. The digital LOS processor of claim 11, wherein the digital summer is configured to sum all of the digital signals to produce a digital signal on a primary sum channel.

13. The digital LOS processor of claim 12, further comprising:

a plurality of digital summers configured to sum different subsets of less than all said plurality of digital signals to produce different digital signals on respective secondary sum channels;

a plurality of digital pulse detectors configured to compare sample amplitudes of the digital signals on the secondary sum channels to respective detection thresholds to detect pulses including pulse samples with amplitudes above the threshold and noise samples with amplitudes below the threshold; and a plurality of threshold processors paired with said plurality of digital pulse detectors, each said threshold processor configured to process the noise samples of the associated channel to estimate noise and update the detection threshold of the paired pulse detector as a function of the noise.

14. The digital LOS processor of claim 11, wherein said processor is configured to determine which channels are likely to have relatively high and low SNR and selectively deactivate the digital pulse detector for one or more of the individual channels or primary and secondary sum channels having relatively low SNR.

15. A digital line-of-sight (LOS) processor for detecting electromagnetic (EM) pulses reflected off a target from a source that emits the EM pulses at known pulse repetition intervals and computing a LOS to the target, comprising:

a plurality of A/D converters configured to convert respective analog signals from a multi-channel detector into a plurality of digital signals on respective individual channels;

a digital summer configured to sum all of said digital signals to produce a digital signal on a primary sum channel;

a plurality of digital pulse detectors configured to compares sample amplitudes of the digital signal on the primary sum channel and each of the individual digital channels to respective detection thresholds to detect pulses including pulse samples with amplitudes above the threshold and noise samples with amplitudes below the threshold;

a plurality of threshold processors paired with said plurality of digital pulse detectors, said threshold processor configured to process the noise samples of the paired channel to estimate noise and update the detection threshold of the paired pulse detector multiple times per pulse repetition interval as a function of the product of the channel noise and a constant false-alarm rate (CFAR) factor;

a memory;

a memory controller that upon detection of a pulse by any one of the one or more pulse detectors stores a plurality of samples for each said individual channel in said memory; and a processor that processes the sample amplitudes for the individual channels to calculate a LOS to a target.

16. The digital LOS processor of claim 15, wherein said embedded processor is configured to increase the CFAR factor as soon as a pulse count exceeds a maximum count defined for a fixed period and reset a count period.

17. The digital LOS processor of claim 16, wherein said embedded processor is configured to reduce the CFAR factor if the pulse count is less than a minimum count at the end of the fixed period and more aggressively reduce the CFAR factor if the pulse count is zero for a defined sub-period less than said fixed period.

18. The digital LOS processor of claim 15, further comprising:

a plurality of digital summers configured to sum different subsets of less than all said plurality of digital signals to produce different digital signals on respective secondary sum channels;

a plurality of digital pulse detectors configured to compare sample amplitudes of the digital signals on the secondary sum channels to respective detection thresholds to detect pulses including pulse samples with amplitudes above the threshold and noise samples with amplitudes below the threshold; and a plurality of threshold processors paired with said plurality of digital pulse detectors, each said threshold processor configured to process the noise samples of the associated channel to estimate noise and update the detection threshold of the paired pulse detector as a function of the noise.

19. The digital LOS processor of claim 18, wherein said processor is configured to determine which channels are likely to have relatively high and low SNR and selectively deactivate the digital pulse detector for one or more of the individual channels or primary and secondary sum channels having relatively low SNR.

* * * * *